(12) United States Patent
Zayats et al.

(10) Patent No.: US 11,687,848 B2
(45) Date of Patent: Jun. 27, 2023

(54) IDENTIFYING CORRELATED ROLES USING A SYSTEM DRIVEN BY A NEURAL NETWORK

(71) Applicant: Accenture Global Solutions Limited, Dublin (IE)

(72) Inventors: Mykhaylo Zayats, Dublin (IE); Benedikt Maximilian Johannes Golla, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 822 days.

(21) Appl. No.: 16/385,690

(22) Filed: Apr. 16, 2019

(65) Prior Publication Data

US 2020/0334599 A1 Oct. 22, 2020

(51) Int. Cl.

| | | |
|---|---|---|
| *G06F 16/35* | (2019.01) | |
| *G06Q 10/0631* | (2023.01) | |
| *G06F 40/30* | (2020.01) | |
| *G06F 40/44* | (2020.01) | |
| *G06F 40/295* | (2020.01) | |
| *G06F 16/36* | (2019.01) | |
| *G06F 18/214* | (2023.01) | |
| *G06F 18/231* | (2023.01) | |
| *G06N 3/045* | (2023.01) | |
| *G06F 40/284* | (2020.01) | |

(52) U.S. Cl.
CPC ..... *G06Q 10/06311* (2013.01); *G06F 16/355* (2019.01); *G06F 16/36* (2019.01); *G06F 18/214* (2023.01); *G06F 18/231* (2023.01); *G06F 40/295* (2020.01); *G06F 40/30* (2020.01); *G06F 40/44* (2020.01); *G06N 3/045* (2023.01); *G06F 40/284* (2020.01)

(58) Field of Classification Search
CPC ........ G06F 40/295; G06F 40/30; G06F 40/44; G06F 16/36; G06F 16/355; G06K 9/6219; G06K 9/6256; G06N 3/0454; G06Q 10/06311
See application file for complete search history.

(56) References Cited

U.S. PATENT DOCUMENTS 9,535,902 B1 * 1/2017 Michalak ................ G06F 40/30
10,147,020 B1 * 12/2018 Hodson ................ G06Q 10/063
(Continued)

*Primary Examiner* — Matthew J Ellis
(74) *Attorney, Agent, or Firm* — Harrity & Harrity, LLP

(57) ABSTRACT

A device receives a request associated with standardizing organization-specific roles within an organization, where the request includes data that identifies titles for the organization-specific roles. The device converts the data to vectors that represent semantic meanings of the titles. The device sets a configuration of a data model by assigning weighted values to title-class identifiers that are used to associate titles, of a standardized set of titles, to a hierarchy of role classifications. The device uses the data model to determine scores that indicate likelihoods of the titles mapping to the title-class identifiers. The device identifies, based on scores, a subset of title-class identifiers that associate particular titles, of the standardized set of titles, and particular role classifications. The subset of title-class identifiers is stored in association with information relating to the particular titles. The device performs an action based on the information relating to the particular titles.

20 Claims, 11 Drawing Sheets

(56) References Cited

U.S. PATENT DOCUMENTS

| | | | |
|---|---|---|---|
| 2011/0179370 A1* | 7/2011 | Cardno | G06K 9/6267 715/771 |
| 2015/0095318 A1* | 4/2015 | Burrus | G06Q 10/1053 707/723 |
| 2017/0286914 A1* | 10/2017 | Fang | G06N 20/00 |
| 2017/0371957 A1* | 12/2017 | Merhav | G06Q 50/01 |
| 2018/0060749 A1* | 3/2018 | Yan | G06Q 50/01 |
| 2019/0108226 A1* | 4/2019 | Boxwell | G06F 16/24575 |
| 2019/0361719 A1* | 11/2019 | Vangala | G06F 9/453 |

\* cited by examiner

IDENTIFYING CORRELATED ROLES USING A SYSTEM DRIVEN BY A NEURAL NETWORK

BACKGROUND

Machine learning is a field of computer science that gives computers the ability to learn without being explicitly programmed. For example, a machine learning model may be trained on a set of training data, such that the model may be used to process live data to generate useful predictions and/or classifications.

SUMMARY

According to some implementations, a method may include receiving, by a device, a request associated with standardizing a set of organization-specific roles within an organization. The request may include information comprising one or more of: data that identifies a set of titles for the set of organization-specific roles, or an industry identifier of an industry in which the organization operates. The method may include converting, by the device, the data that identifies the set of titles to a set of vectors that represent semantic meanings of the set of titles. The method may include setting, by the device and based on the information included in the request, a configuration of a data model that is capable of scoring the set of titles. Setting the configuration may include assigning weighted values to a set of title-class identifiers that are used to associate a standardized set of titles to a hierarchy of role classifications that identify types of the standardized roles within organizations. The weighted values may be assigned based on at least one of: a specific hierarchy of role classifications within the organization, or the industry in which the organization operates. The method may include determining, by the device and by using the data model that has been configured with the assigned weighted values to process the set of vectors, a set of scores that indicate likelihoods of the set of titles mapping to the set of title-class identifiers. The method may include identifying, by the device and based on the set of scores, a subset of title-class identifiers, of the set of title-class identifiers, that associate particular titles, of the standardized set of titles, and particular role classifications that are part of the hierarchy of role classifications. The subset of title-class identifiers may be stored in association with information relating to particular standardized roles. The method may include performing, by the device and by using the information relating to the particular standardized roles, one or more actions to cause one or more tasks associated with the set of organization-specific roles to be modified or eliminated.

According to some implementations, a device may include one or more memories, and one or more processors, operatively coupled to the one or more memories, to receive a data model that has been trained to map organization-specific roles to a standardized set of titles for standardized roles within organizations, and a hierarchy of role classifications that identify classes used to group the standardized roles. The one or more processors may receive a request associated with standardizing a set of organization-specific roles within an organization. The request may include information comprising data that identifies a set of titles for the set of organization-specific roles. The one or more processors may convert the data that identifies the set of titles to a set of vectors that represent semantic meanings of the set of titles, and may determine, by using the data model to process the set of vectors, a set of scores that indicate likelihoods of the set of titles mapping to a set of title-class identifiers. The set of title-class identifiers may be used to associate the standardized set of titles to the hierarchy of role classifications that identify types of the standardized roles within the organizations. The set of scores may be determined using a cost function of the data model that assigns weighted values to the set of title-class identifiers based on the information included in the request. The one or more processors may identify, based on the set of scores, a subset of title-class identifiers, of the set of title-class identifiers, that associate particular titles, of the standardized set of titles, and particular role classifications that are part of a standardized hierarchy of role classifications. The one or more processors may obtain information relating to particular standardized roles that is stored in association with the subset of title-class identifiers. The one or more processors may perform one or more actions to cause one or more tasks associated with the set of organization-specific roles to be modified or eliminated based on the information relating to the particular standardized roles.

According to some implementations, a non-transitory computer-readable medium may store instructions that include one or more instructions that, when executed by one or more processors of a device, cause the one or more processors to receive a request associated with standardizing a set of organization-specific roles within an organization. The request may include information comprising: data that identifies a set of titles for the set of organization-specific roles, and an industry identifier of an industry in which the organization operates. The one or more instructions may cause the one or more processors to convert the data that identifies the set of titles to a set of vectors that represent semantic meanings of the set of titles, and may determine, by using a data model to process the set of vectors, a set of scores that indicate likelihoods of the set of titles mapping to a set of title-class identifiers. The set of title-class identifiers may be used to associate a standardized set of titles to a hierarchy of role classifications that identify classes used to group standardized roles within organizations. The set of scores may be determined using a cost function of the data model that assigns weighted values to the set of title-class identifiers based on the information included in the request. The one or more instructions may cause the one or more processors to identify, based on the set of scores, a subset of title-class identifiers, of the set of title-class identifiers, that associate particular titles, of the standardized set of titles and particular role classifications that are part of a standardized hierarchy of role classifications. The one or more instructions may cause the one or more processors to obtain information relating to particular standardized roles that is stored in association with the subset of title-class identifiers. The one or more instructions may cause the one or more processors to perform one or more actions to cause one or more tasks associated with the set of organization-specific roles to be modified or eliminated based on the information relating to the particular standardized roles.

DETAILED DESCRIPTION

Figure 1A:
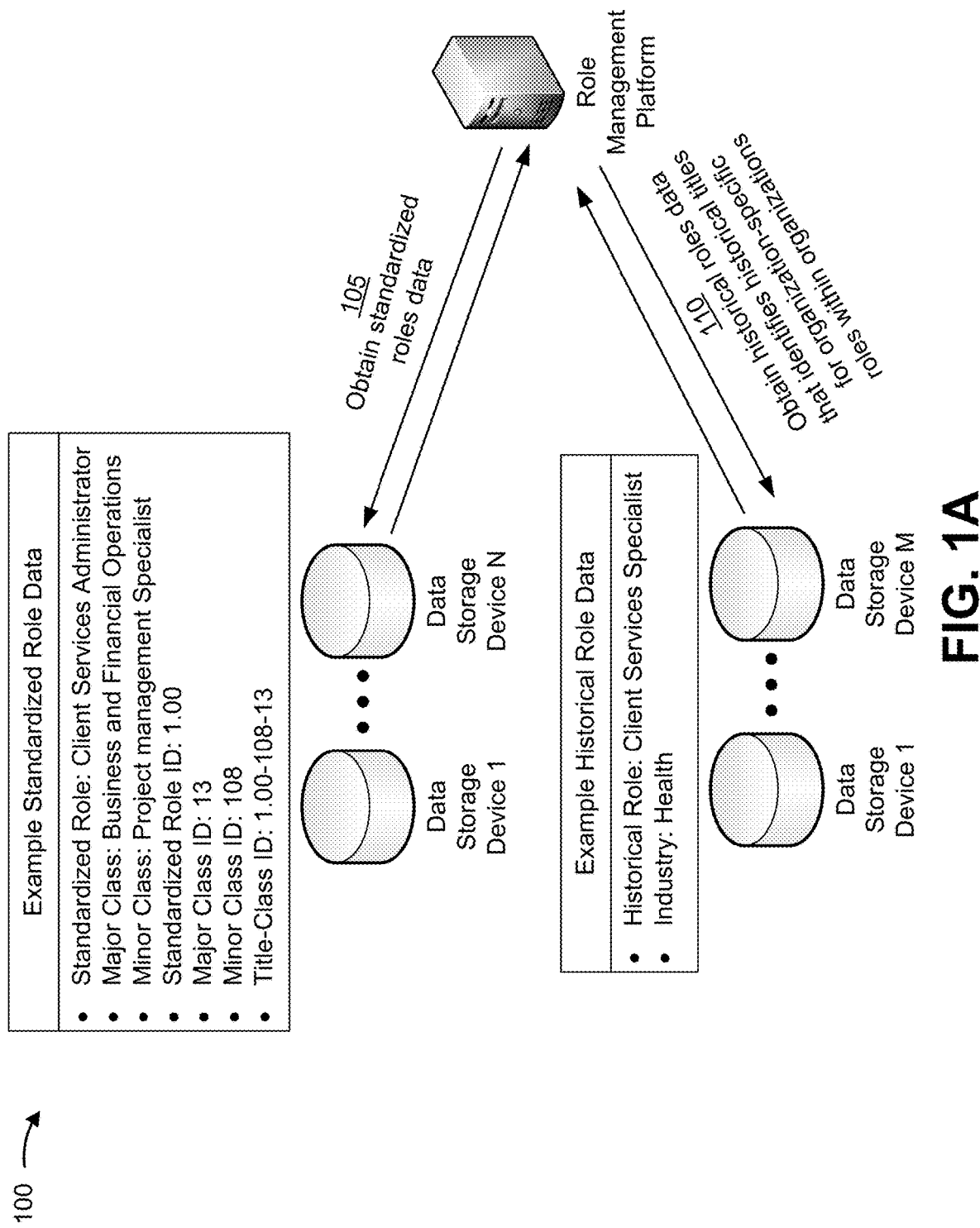
FIGS. 1A-1F are diagrams of one or more example implementations described herein.

The following detailed description of example implementations refers to the accompanying drawings. The same reference numbers in different drawings may identify the same or similar elements.

Business process improvement (BPI) is a technical field whereby an organization may improve efficiencies of one or more organizational processes. For example, an organization may have a set of roles that are used to allocate specific tasks or functions to employees of the organization. In this case, the organization may consider using one or more BPI services or related services to improve efficiencies within the organization.

One solution may involve utilizing a taxonomy of information that is provided by a third-party organization. For example, the third-party organization may publish a taxonomy of information that includes a list of standardized roles (e.g., that have been standardized across one or more industries) and may associate identifiers for the standardized roles with information that may be used to improve a process of a role or a task, automate a role or a task, and/or the like.

However, the organization may be unable to take advantage of the useful information provided by the taxonomy because the roles within the organization may not map or correlate directly to the standardized roles. Furthermore, conventional natural language processing may be an ineffective solution given that many roles may have similar titles despite being related to very different tasks. For example, the taxonomy of information may have a first standardized role titled Client Services Administrator, a second standardized role titled Client Services Coordinator, and a third standardized role titled Client Services Representative. In this case, if the organization has a role titled Client Services Specialist, conventional natural language processing may be ineffective at identifying which standardized role should map to the role within the organization.

Additionally, without being able to utilize the information included in the taxonomy, the organization will be unable to optimize roles and/or tasks, which may cause devices associated with the organization to waste resources by continuing to inefficiently carry out roles or tasks (e.g., processing resources, network resources, memory resources, and/or the like). For example, the organization may include a first example role that includes ten example organizational tasks. In this case, one or more devices associated with the organization (e.g., a telephone, a desktop computer, a network device, a server platform, and/or the like) may expend resources to assist employees in carrying out the tasks. If the information included in the taxonomy allows one or more of the ten example organizational tasks to be automated, or identifies a process improvement that eliminates a need for one or more of the example organizational tasks, then the resources expended by the one or more devices associated with the organization are wasted by assisting in carrying out tasks that would not otherwise be necessary if the information included in the taxonomy was available to the organization.

While this is provided by way of example, it is to be understood that the organization may, for example, be a large organization with thousands of employees, tens of thousands of employees, or more, and that thousands of devices, tens of thousands of devices, or more, may needlessly waste resources to perform roles and/or tasks that might be eliminated or improved if the organization was unable to access the information included in the taxonomy.

Some implementations described herein provide a role management platform to map organization-specific roles within an organization to standardized roles and to cause one or more tasks associated with the organization-specific roles to be modified or eliminated based on information made available from the mapping. For example, an individual working for the organization may interact with a user device to input a request to map a set of titles for the organization-specific roles to a standardized set of titles for the standardized roles. The request may be provided to the role management platform and the role management platform may convert data that identifies the set of titles to a set of vectors that represent semantic meanings of the set of titles.

Additionally, the role management platform may set a configuration of a data model by updating one or more target weights of a cost function of the data model based on the information included in the request. Furthermore, the role management platform may use the data model to process the set of vectors to determine a set of scores that indicate likelihoods of the set of titles mapping to the set of title-class identifiers. This may allow the role management platform to identify, based on the set of scores, a subset of title-class identifiers that associate particular titles, of the standardized set of titles, and particular role classifications that are part of the hierarchy of role classifications. The subset of title-class identifiers may be stored in association with information relating to the particular titles (as will be explained further herein). In this case, the role management platform may use the information relating to the particular titles to perform one or more actions that cause tasks associated with the organization-specific roles to be modified or eliminated.

By mapping the set of titles for the organization-specific roles to the standardized set of titles for the standardized roles, the role management platform is able to perform actions that improve efficiencies within the organization. In this way, the role management platform provides for an efficient and effective utilization of resources of devices associated with the organization (e.g., processing resources, network resources, memory resources, and/or the like). For example, by mapping a title of an organization-specific role to a title of a standardized role, the role management platform is able to obtain information relating to the standardized role, such as information that indicates how to modify or improve one or more tasks of the standardized role, information that indicates how a process may be modified such that a task of the standardized role may be removed, and/or the like. By accessing this information, the role management platform is able to perform actions that cause the organization-specific role to be improved, such as by eliminating an unnecessary task of the organization-specific role, modifying a task of the organization-specific role, and/or the like. This conserves resources of devices that would have otherwise inefficiently performed these tasks had the organization been unable to utilize the information associated with the standardized role.

FIGS. 1A-1F are diagrams of one or more example implementations 100 described herein. For example, example implementation 100 may include a first group of data storage devices (shown as Data Storage Device 1 through Data Storage Device N), a second group of data storage devices (shown as Data Storage Device 1 through Data Storage Device M), a role management platform, and a client device.

Figure 1B:
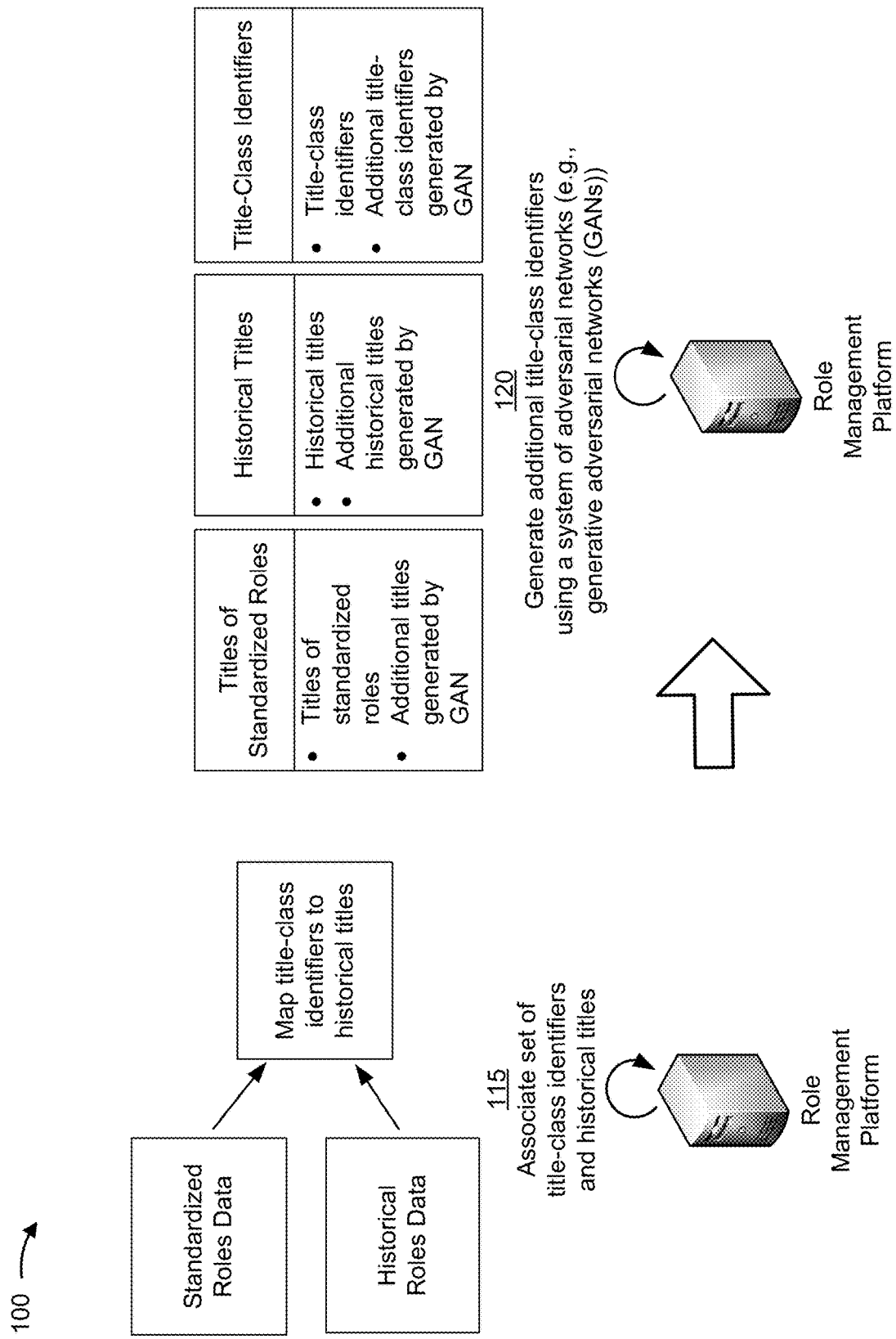
Figure 1C:
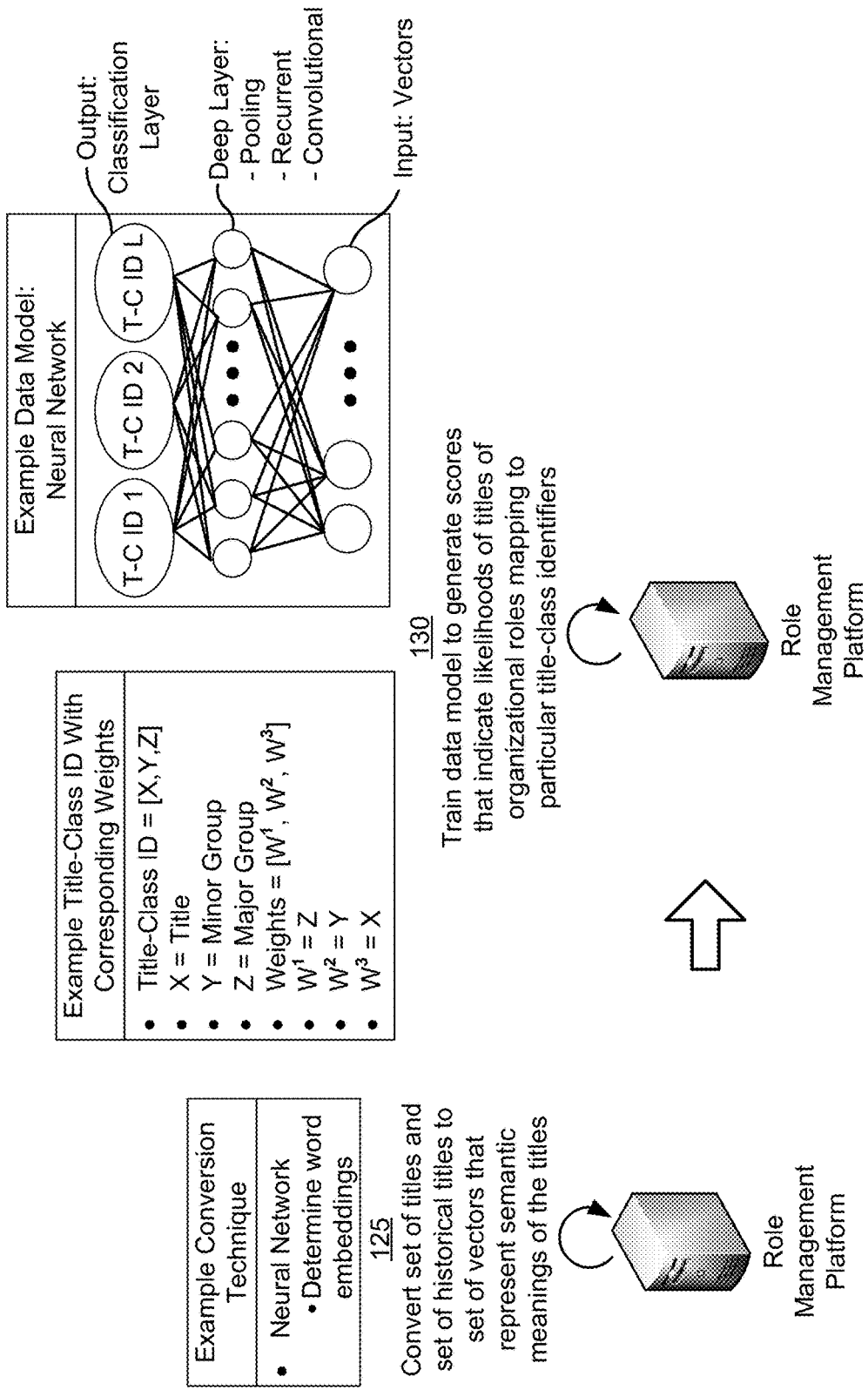
Figure 1D:
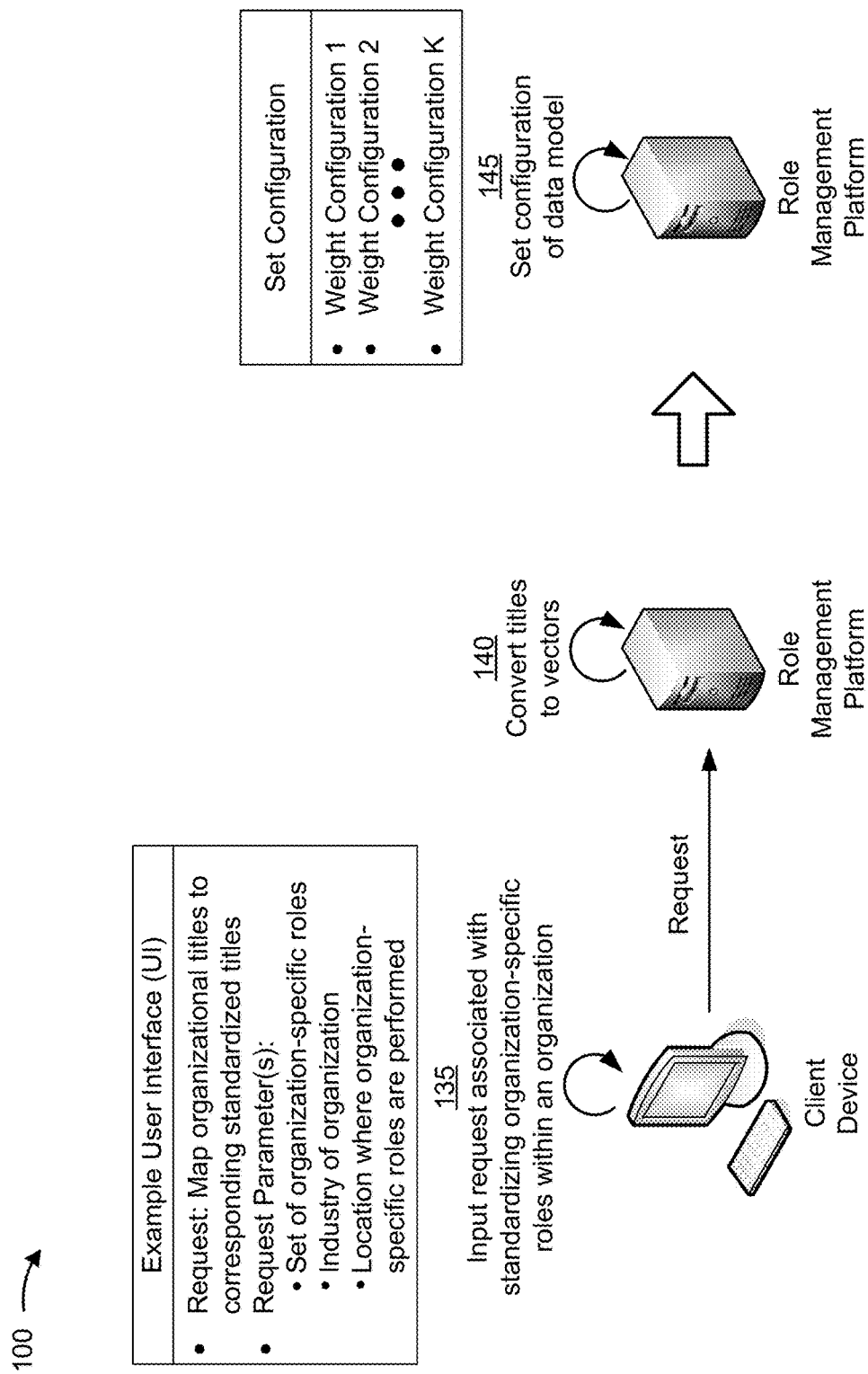
Figure 1E:
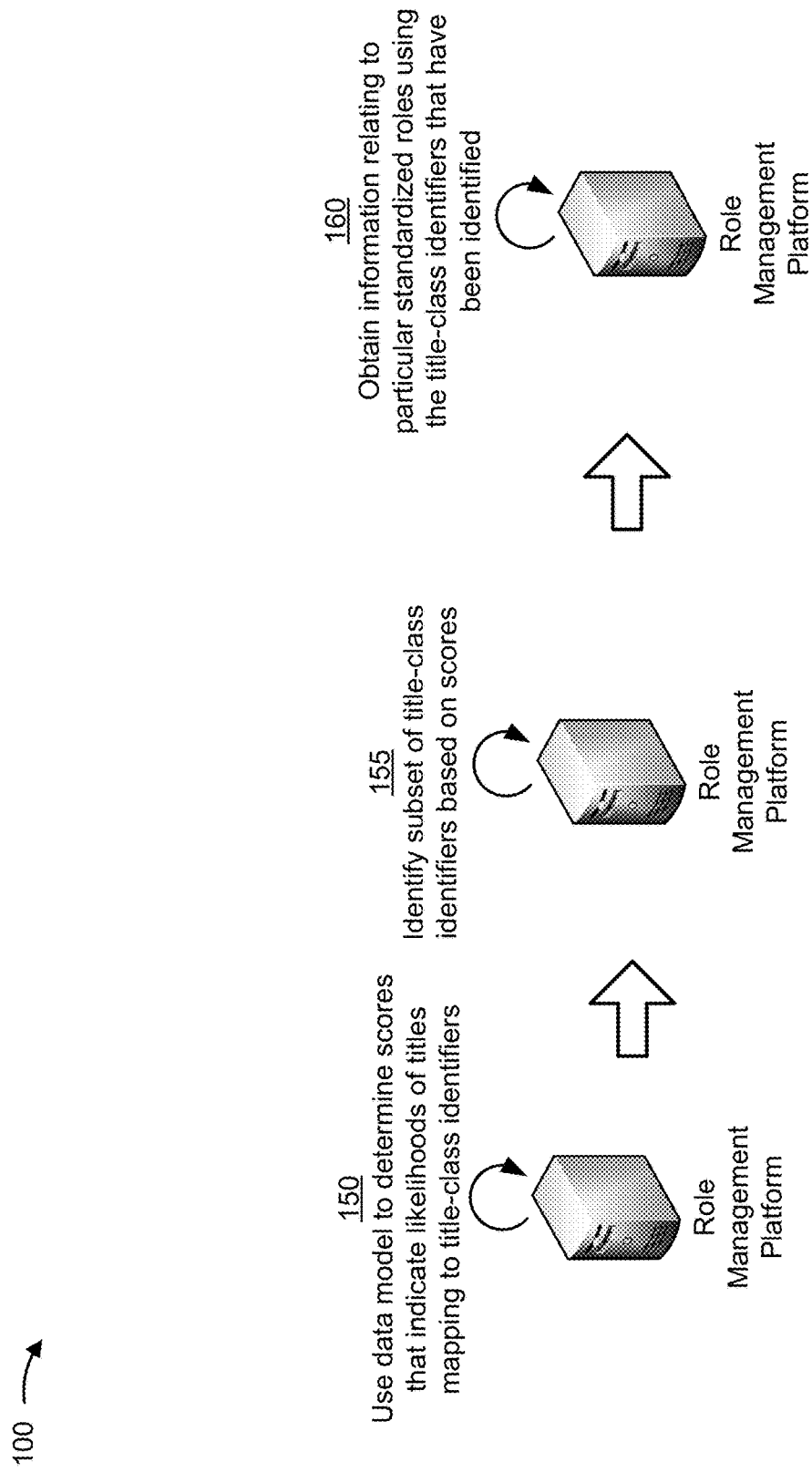
Figure 1F:
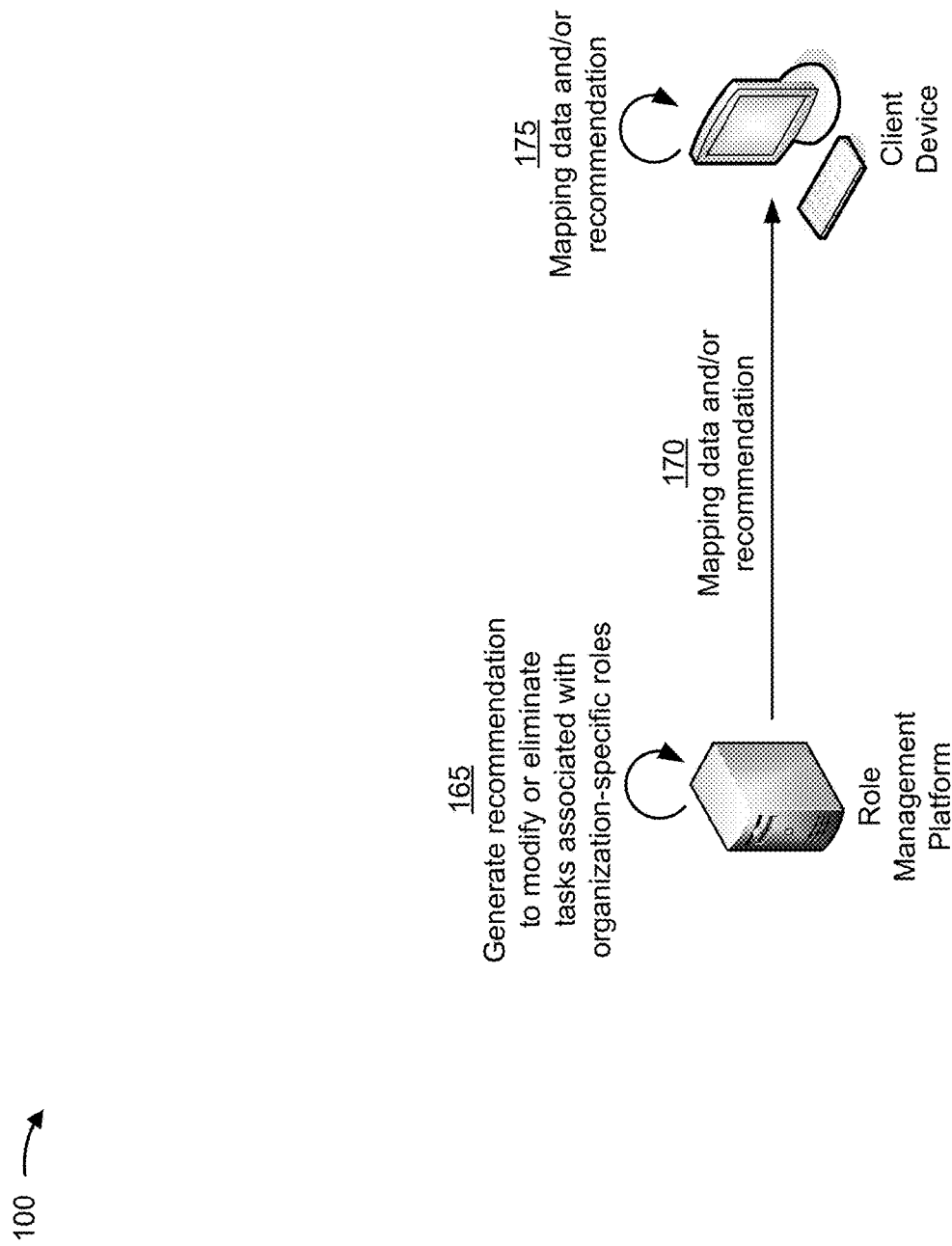

As shown in FIGS. 1A-1C, the role management platform may train one or more data models to determine likelihoods of particular organization-specific roles mapping to particular standardized roles. As shown in FIGS. 1D-1F, the role management platform may use the one or more data models to map a set of titles for organization-specific roles within an organization to a standardized set of titles for standardized roles and may use information that is made accessible by the mapping to perform one or more actions that cause one or more tasks associated with the organization-specific roles to be modified or eliminated.

As shown in FIG. 1A, and by reference number 105, the role management platform may obtain standardized roles data from the first group of data storage devices. For example, the role management platform may use an application programming interface (API) or a similar type of interface to obtain the standardized roles data from the first group of data storage devices.

The standardized roles data may include data that identifies a set of titles for a set of standardized roles, data that identifies a hierarchy of classes used to group standardized roles within organizations, a set of title-class identifiers that associate particular standardized roles and particular classes in the hierarchy of roles, and/or the like. The data that identifies the set of titles may include data that identifies or describes a name of a title for a standardized role, data that identifies or describes one or more tasks that are assigned to the standardized role, and/or the like. To provide a few specific examples, the standardized set of titles may include a first subset of titles for standardized roles within a marketing department, a second subset of titles for standardized roles within an accounting department, a third subset of titles for standardized roles within a sales department, a fourth subset of titles for standardized roles within a supply chain department, a fifth subset of titles for standardized roles within a customer service department, and/or the like.

The data that identifies the hierarchy of roles may include a class type identifier that identifies a type of class within the hierarchy, a class identifier that identifies a particular class within the hierarchy, and/or the like. For example, the hierarchy of roles may include classes that are segmented based on generic groupings (e.g., a major class, a minor class, etc.), classes that are segmented based on clusters of roles within organizations (e.g., as divided by departments or using other means), classes that are segmented based on the types of tasks performed within roles, classes that are segmented based on pay levels associated with roles, and/or the like. The classes may include, for example, a management class, a legal class, an office and administrative support class, a financial operations class, a marketing and sales class, and/or the like.

In some implementations, the classes may be further segmented into tiers of classes. For example, if the hierarchy includes two tiers of classes, a major tier and a minor tier, a management class may be defined as being part of a major tier class, and classes that fit within the management class may be defined as being part of a minor tier class (e.g., a first minor class for human resources management, a second minor class for supply chain management, etc., or a first minor class for mid-level management, a second minor class for high-level management, etc.).

The title-class identifiers may include a 1+N tuple of values that are used to associate a title of a standardized role with a number N of class tiers within the hierarchy. As shown as an example, a title-class identifier may include a 3-tuple of values (shown as 1.00-108-13), where a first value is a title identifier (shown as 1.00), a second value is a minor tier identifier (shown as 108), and a third value is a minor identifier (shown as 13). This may allow a standardized role to, in some cases, be associated with multiple minor tiers and multiple major tiers. As an example, the standardized role may be used across multiple departments within an organization, across multiple industries, and/or the like. In this example, when the standardized role is performed in a first industry, the standardized role may be associated with a first minor class tier and a first major class tier. When the standardized role is performed in a second industry, the standardized role may be associated with a second minor class tier and a second major class tier.

In some implementations, the role management platform may obtain standardized roles data from a single data storage device (e.g., data storage device 1, data storage device 2, etc.). In some implementations, the role management platform may obtain standardized roles data from multiple data storage devices (e.g., two or more of the first group of data storage devices). For example, different third-party organizations may offer publicly accessible standardized roles data, and the role management platform may perform API calls to obtain the standardized roles data from the multiple data storage devices. In this case, the role management platform may aggregate the standardized roles data obtained from the multiple data storage devices (e.g., using one or more techniques described further herein). In some cases, because each third-party organization may use different title-class identifiers, the role management platform may generate a unique title-class identifier that corresponds to title-class identifiers obtained from each respective data storage device.

As shown by reference number 110, the role management platform may obtain historical roles data that identifies a set of historical titles for organization-specific roles of a group of organizations. For example, the role management platform may obtain historical roles data using an API or a similar type of interface. The historical roles data (and the standardized roles data) may be obtained to allow the role management platform to train a data model that is able to map organization-specific roles to standardized roles, as described further herein. The historical roles data may include historical data that identifies a set of historical titles for organization-specific roles within particular organizations, data that identifies a hierarchy of roles within the particular organizations, data that identifies an industry in which the particular organizations operate, data that identifies a geographic location where one or more historical roles are performed, and/or the like.

In this way, the role management platform obtains standardized roles data and historical roles data that may be used to train a data model.

As shown in FIG. 1B, the role management platform may perform one or more actions to generate additional training data that may be used to train the data model. For example, and as shown by reference number 115, the role management platform may associate the set of title-class identifiers and the set of historical titles. In this case, the set of historical titles may identify historical titles for organization-specific roles within particular organizations, and the role management platform may perform one or more data aggregation techniques, one or more natural language processing techniques, one or more mapping techniques, and/or the like, to associate each historical title with a title-class identifier of the set of title-class identifiers.

In some implementations, the role management platform may associate the set of title-class identifiers and the set of historical titles using one or more natural language processing techniques and/or one or more mapping techniques. For example, an organization, of the group of organizations, may have organization-specific roles and/or a hierarchy of roles that is different than the standardized roles and hierarchy included in the standardized roles data. In this case, the role management platform may perform a natural language processing technique to identify a semantic meaning of the historical title of the organization-specific role and a semantic meaning of a title of a standardized role. Additionally, the role management platform may perform a mapping technique to map particular historical titles to particular title-class identifiers. For example, the role management platform may perform the mapping technique to map the historical title to the title of the standardized role based on a semantic similarity between the titles, based on a semantic similarity between a class tier included in a hierarchy of organization-specific roles and a class tier included in a hierarchy of standardized roles, and/or the like.

Additionally, or alternatively, one or more historical titles may have been previously stored in association with the set of title-class identifiers (e.g., one or more organizations, of the group of organizations, may have already manually generated these associations). In this case, the role management platform may perform one or more data aggregation techniques to aggregate the set of title-class identifiers associated with the titles for the standardized roles and the title-class identifiers associated with the one or more historical titles.

As shown by reference number 120, the role management platform may generate additional title-class identifiers using a system of adversarial networks. For example, the role management platform may generate additional title-class identifiers using generative adversarial networks (GANs) and/or a similar system of adversarial networks. In this case, the role management platform may train GANs (or may receive trained GANs) and may use the GANs to generate additional titles, of the standardized set of titles, to generate additional historical titles, to generate additional title-class identifiers for the additional titles and for the additional historical titles, and to update the set of title-class identifiers to include the additional title-class identifiers, as each described below.

In some implementations, the role management platform may train a set of cycle GANs. For example, the role management platform may train a first set of neural networks (referred as herein as generator networks) and may train a second set of neural networks (referred to as herein as discriminator networks). In this case, the generator networks may be responsible for generating new data that is similar to existing data (e.g., new titles for roles that are similar to titles for standardized roles and that are similar to historical titles for organization-specific roles). Additionally, the discriminator networks may be responsible for analyzing initial input data and the new data to determine a final dataset, as further described below.

In some implementations, the role management platform may use a first generator network to generate additional titles for the set of standardized roles. For example, the role management platform may provide the data that identifies the standardized set of titles for the set of standardized roles as input to the first generator network to cause the first generator network to output new data that identifies the additional titles. In some cases, the role management platform may convert the data to a set of vectors that represent semantic meanings of the set of titles (as further described elsewhere herein) and may provide the set of vectors as input to the first generator network.

Additionally, the role management platform may use a first discriminator network to determine a final set of titles. For example, the first discriminator network may have been trained using the standardized set of titles for the standardized roles, and the role management platform may provide the new title data that identifies the additional titles (or a first set of vectors) as input to the first discriminator network to cause the first discriminator network to generate output values that indicate likelihoods of the additional titles being permissible extensions to the standardized set of titles for the standardized roles (e.g., based on whether an additional title satisfies a threshold level of similarity with one or more titles for standardized roles). In this case, the first discriminator network may provide the output values back to the first generator network to allow the first generator network to use the output values when continuing to generate additional titles. This process may be iteratively repeated until a stop condition is satisfied, which may cause the role management platform to update the standardized set of titles to include one or more of the additional titles.

In some implementations, the role management platform may use a second generator network to generate additional historical titles for the set of organization-specific roles. For example, the role management platform may provide the historical data that identifies the set of historical titles as input to the second generator network to cause the second generator network to output new historical data that identifies the additional historical titles. In some cases, the role management platform may convert the historical data to a set of vectors that represent semantic meanings of the set of historical titles (as further described elsewhere herein) and may provide the set of vectors as input to the second generator network.

Additionally, the role management platform may use a second discriminator network to determine a final set of historical titles. For example, the second discriminator network may have been trained using the set of historical titles, and the role management platform may provide the new historical data that identifies the additional titles (or a first set of vectors) as input to the second discriminator network to cause the second discriminator network to generate output values that indicate likelihoods of the additional historical titles being permissible extensions to the set of historical titles (e.g., based on whether an additional historical title satisfies a threshold level of similarity with one or more historical titles). In this case, the second discriminator network may provide the output values back to the second generator network to allow the second generator network to use the output values when continuing to generate additional historical titles. This process may be iteratively repeated until a stop condition is satisfied, which may cause the role management platform to update the set of historical titles to include one or more of the additional historical titles.

In some implementations, the role management platform may use a third generator network to generate additional title-class identifiers. For example, the role management platform may provide the new data that identifies the additional titles and the new historical data that identifies the additional historical titles as input to the third generator network to cause the third generator network to output the additional title-class identifiers. In some cases, the role management platform may convert the new data and the new historical data to a set of vectors (as further described elsewhere herein) and may provide the set of vectors as input to the third generator network.

Additionally, the role management platform may use a third discriminator network to determine a final set of title-class identifiers. For example, the third discriminator network may have been trained using the set of title-class identifiers, and the role management platform may provide the additional title-class identifiers (or a first set of vectors) as input to the third discriminator network to cause the third discriminator network to generate output values that indicate likelihoods of the additional title-class identifiers being permissible identifiers to include in the set of title-class identifiers (e.g., based on whether the additional title-class identifiers are within a permissible range of identifier values that are not used by existing title-class identifiers). In this case, the third discriminator network may provide the output values back to the third generator network to allow the third generator network to use the output values when continuing to generate additional title-class identifiers. This process may be iteratively repeated until a stop condition is satisfied, which may cause the role management platform to update the set of title-class identifiers to include one or more of the additional title-class identifiers.

It is to be understood that one or more of the implementations described above are provided by way of example. In practice, another combination of neural networks may be used. For example, a single generator network may be averse to a single discriminator network, where the single generator network performs the functions that are described as being performed by the three generator networks and the single discriminator network performs the functions that are described as being performed by the three discriminator networks.

In this way, the role management platform is able to generate additional titles, additional historical titles, and additional title-class identifiers that may be used as training data to train the data model that is capable of mapping titles for organization-specific roles to titles for standardized roles, as further described below.

As shown in FIG. 1C, and by reference number 125, the role management platform may convert the standardized set of titles for the standardized roles and the set of historical titles for the organization-specific roles within the organizations to a set of vectors. For example, the role management platform may convert the standardized set of titles to vectors that represent semantic meanings of the standardized set of titles and may convert the set of historical titles to vectors that represent semantic meanings of the set of historical titles. In this case, the role management platform may perform the conversion using one or more neural networks that are trained to produce word embeddings.

As an example, the role management platform may convert the standardized set of titles and the set of historical titles to a set of vectors using a two-layer Word2vec neural network. In this example, the role management platform may provide the standardized set of titles and the set of historical titles as input to the two-layer Word2vec neural network to cause the two-layer Word2vec neural network to output a set of vectors. The set of vectors may be an array of numerical values that represent semantic meanings of titles and historical titles. To generate the set of vectors, the two-layer Word2vec neural network may process the standardized set of titles and set of historical titles using a continuous bag-of-words (CBOW) technique, a continuous skip-gram technique, and/or a similar type of technique.

As shown by reference number 130, the role management platform may train a data model to generate scores that indicate likelihoods of titles for organization-specific roles mapping to particular title-class identifiers. For example, the role management platform may train a data model by using one or more machine learning techniques to analyze the data that identifies the standardized set of titles, the data that identifies the set of historical titles, set of vectors, and/or the like. The one or more machine learning techniques may include one or more classification techniques, one or more regression techniques, one or more techniques used specifically for training a neural network (e.g., a feedforward technique, a backpropagation technique, and/or the like), and/or the like.

In some implementations, the role management platform may train a neural network. For example, the role management platform may train a neural network that has an input layer, one or more intermediate layers (e.g., a fully connected layer, a convolutional layer, a pooling layer, a recurrent layer, and/or the like), and an output layer. To train the neural network, the role management platform may initialize a set of network weights that may be used when processing the set of vectors, may initialize a set of target weights that may reflect a relevance of a class to a particular industry or organization, may perform a feedforward technique to analyze the set of vectors to determine a first set of scores, may perform a backpropagation technique to update the set of network weights, and may iteratively repeat these steps until a stop condition is satisfied (e.g., until scores generated by the neural network match known output values, until a threshold level of accuracy of satisfied, and/or the like), as further described below.

In some implementations, the role management platform may initialize the set of network weights. For example, the role management platform may initialize the set of network weights randomly, using pre-determined values, and/or the like. The set of network weights may be updated via the backpropagation technique, as further described below.

Additionally, or alternatively, the role management platform may initialize a set of target weights. For example, the set of target weights may be hyperparameters and the role management platform may use the set of target weights as part of a cost function of the neural network. The cost function of the neural network may be used to weight particular portions of title-class identifiers. For example, if a title-class identifier associates a title with a number N of classes, then a target weight, of the set of target weights, may include 1+N target sub-weights, where each sub-weight is assigned to a particular portion of the title-class identifier. In the example shown in FIG. 1A, the title-class identifier associates a title identifier with two class identifiers (shown as 1.00-108-13). In this example, because there are two classes, the role management platform may initialize the set of target weights to include three sub-weights, such that a first target sub-weight may be assigned to the title identifier, a second target sub-weight may be assigned to an identifier of a minor class tier, and a third target sub-weight may be assigned to an identifier of a major class tier.

In some implementations, the role management platform may perform a feedforward technique to analyze the set of vectors to determine an initial set of scores. For example, the role management platform may provide a vector that represents an organization-specific role as input to the neural network. This may cause the neural network to generate a first array of values that indicate likelihoods of the organization-specific role being particular standardized roles, a second array of values that indicate likelihoods of the organization role being part of particular minor groups, and a third array of values that indicate likelihoods of the organization-specific role being part of particular major class tiers. Additionally, the neural network may, based on an analysis of the first array, the second array, and the third array, generate a fourth array of values that indicate likelihoods of the organization-specific role mapping to the set of title-class identifiers.

In some implementations, the role management platform may perform a backpropagation technique to update the set of network weights. For example, the neural network may be configured with a loss function, such as a cross entropy loss function. In this case, the role management platform may execute the loss function to compare the initial set of scores to known output values (e.g., which may indicate which title-class identifiers should be mapped to each organization-specific role) to determine an error value (e.g., an absolute error value, a squared error value, and/or the like). Additionally, the role management platform may update the set of network weights based on the error value.

In some implementations, the role management platform may update the set of target weights using a rule. For example, the loss function may be configured using a rule that allows an incorrect prediction to cause larger, or smaller, error values, depending on whether the incorrect prediction has incorrectly predicted a title, incorrectly predicted a first class tier in the hierarchy, incorrectly predicted an Nth class tier in the hierarchy, etc.

As a specific example, the loss function may generate a first error value based on an incorrect prediction being made with respect to a title, a second error value based on an incorrect prediction being made with respect to a minor tier class, and a third error value based on an incorrect prediction being made with respect to a major tier class. In this example, the loss function may have been configured to generate larger error values for higher tiers of classification within the hierarchy. For example, the first error value might be much smaller than the second error value and the second error value might be much smaller than the third error value. This allows the role management platform to train the neural network in a manner that effectively makes the neural network risk averse to making incorrect predictions that are associated with mappings in higher tiers of classes within the hierarchy.

As a specific example, for each input value that is mapped to an output value via the data model, the role management platform may inversely map W to $\dot{W}$ in the following way: $W^1 \rightarrow \dot{W}^1:[0,1] \rightarrow [1, h^1]$; $W^2 \rightarrow \dot{W}^2:[0,1] \rightarrow [1, h^2]$; and $W^3 \rightarrow \dot{W}^3:[0,1] \rightarrow [1, h^3]$. In this notation, W (e.g., $W^1$, $W^2$, $W^3$) represents a target weight, $\dot{W}$ (e.g., $\dot{W}^1$, $\dot{W}^2$, $\dot{W}^3$) represents an inverse of the target weight, and h represents a user-defined penalty that may be integrated into a cost function of the data model in the event that the data model misclassifies a role. Additionally, the role management platform may be configured with the following cross entropy loss function: $-\Sigma_{n=1}^{N} \Sigma_{m=1}^{M} w_n^{\sim m}(\widehat{y_n} \log y_n^m + (1-\widehat{y_n})\log(1-y_n^m))$.

In this example, m may represent a particular standardized role, n may represent a number of levels in a role hierarchy, and w may represent a target weight. The first summation shown may take a sum of error values generated for each level of a role hierarchy, which may be determined by the second summation. The second summation shown may take a sum of error values that are calculated for predictions that, for a given input value, are made for a group of standardized roles in the role hierarchy. These error values may, for example, be generated for each level of the role hierarchy (and summed using the first summation, as described above). Furthermore, the notation $w_n^{\sim m}$ may represent a weight to apply to an error value, given a particular m value and a particular n value. The first portion of the function (shown as $\widehat{y_n} \log y_n^m$) may output an error value that is based on whether a predicted value output by the data model was correct and the second portion of the function (shown as $(1-\widehat{y_n})\log(1-y_n^m)$) may output an error value that is based on a predicted value being incorrect.

In some implementations, the role management platform may iteratively perform one or more functions described above until a stop condition is satisfied. For example, the role management platform may determine an updated set of scores, may use the loss function to determine a new error value and may update the set of weights based on the new error value. By comparing error values for each training iteration, the role management platform is able to identify an impact that various combinations of weights have on the neural network's ability to accurately make predictions. As a result, the role management platform is able to continue to update the set of weights until a proper distribution of weights is identified (e.g., that causes a threshold number of predictions to be made correctly, etc.).

In some implementations, the role management platform may generate one or more configurations of different sets of weights. For example, the role management platform may determine that a particular set of weights is more likely (or less likely) to generate accurate outputs depending on a given set of inputs.

As an example, the role management platform may generate a first configuration that includes a first set of weights. In this example, the role management platform may determine, while training the neural network, that if input data identifies a particular hierarchy of classes of an organization, then a first set of weights (e.g., hierarchy-specific weights) is to be applied. As another example, the role management platform may generate a second configuration that includes a second set of weights. In this example, the role management platform may determine, while training the neural network, that if input data includes an industry identifier that identifies an industry in which an organization operates, then the second set of weights (e.g., industry-specific weights) is to be applied.

As another example, the role management platform may generate a third configuration that includes a third set of weights. In this example, the role management platform may determine, while training the neural network, that if input data includes a particular geographic location, then the third set of weights (e.g., location-specific weights) is to be applied. As another example, the role management platform may generate a default configuration that includes a default set of weights. This configuration may be used when none of the other configurations is applicable. It is to be understood that these configurations are provided by way of example. In practice, the neural network may be trained such that any number of different configurations may be implemented.

In this way, the role management platform is able to train a data model that has one or more configurations that may be used, depending upon the context of the input data that is received by the data model.

As shown in FIG. 1D, and by reference number 135, the client device may input a request associated with standardizing organization-specific roles within an organization. For example, a user may use the client device to interact with an interface of an application or a website that allows the user to input a request to standardize organization-specific roles. The user may want to standardize the organization-specific roles such that each organization-specific role maps to a standardized role, of the standardized roles described elsewhere herein. This is because data that identifies the standardized roles may be stored in association with information that may be used for optimizing particular organization-specific roles, as described in detail herein.

In some implementations, the user may input, as part of the request, information that may be used by the role management platform to map the organization-specific roles to the standardized roles. The information may include data that identifies a set of titles for organization-specific roles that are to be mapped to the standardized roles (or data that identifies a storage location of the set of titles for the organization-specific roles), an industry identifier that identifies an industry in which the organization operates, location data that identifies one or more geographic locations in which particular organization-specific roles are performed (e.g., data that identifies one or more sets of geographic coordinates, etc.), and/or the like. When the request is submitted, the request may be provided to the role management platform.

In some implementations, the user may input data that identifies the set of titles for the organization-specific roles by selecting a menu option displayed via the interface. In this case, selecting the menu option may provide the role management platform with permission to search a data structure for data that identifies the set of titles for organization-specific roles. In some implementations, the user may upload data that identifies the set of titles for the organization-specific roles. For example, the user may have a document that includes the data that identifies the set of titles for the organization-specific roles and may upload the document as part of the request. In some implementations, the user may input a link to a storage location that indicates where the data that identifies the set of titles for the organization-specific roles are stored. In this case, the role management platform may use the link to obtain the data that identifies the set of titles for the organization-specific roles.

As shown by reference number 140, the role management platform may convert the data that identifies the set of titles to a set of vectors that represent semantic meanings of the set of titles. For example, the role management platform may convert the data that identifies the set of titles to a set of vectors using a two-layer neural network (e.g., a Word2vec neural network, etc.) or a similar type of network or technique. The two-layer neural network may have been trained to map specific strings of text to a vector space (e.g., using a continuous bag-of-words (CBOW) technique, a continuous skip-gram technique, and/or the like). In this case, the role management platform may provide the data that identifies the set of titles as input to the two-layer neural network to cause the two-layer neural network to output, for each title, of the set of titles, a vector (e.g., an array of values) that represents a semantic meaning of a title of a role.

As shown by reference number 145, the role management platform may set a configuration of the data model. For example, if the data model is a neural network, the role management platform may set a configuration of the neural network by updating the set of weights of the neural network's cost function (e.g., based on the information included in the request). This is because the role management platform may, while training the neural network, have determined that different configurations of weights are more likely to generate accurate outputs given particular inputs.

As an example, if the request includes the data that identifies the set of titles for the organization-specific roles within the organization (but no additional data), the role management platform may select a first set of weights to use for the cost function of the neural network. However, if the request includes data that identifies an industry in which the organization operates, then the role management platform may select a second set of weights to use for the cost function. This is because a particular organization-specific role may exist across multiple industries but may map to a different standardized role and/or a different title-class identifier based on an industry in which the particular organization-specific role is being performed.

Additionally, or alternatively, and provided as another example, if the request includes data that identifies a geographic location in which one or more organizational-specific roles are being actively performed, then the role management platform may select a third set of weights to use for the cost function. This is because cultural norms, which in some cases may be common (and thus identifiable) across certain geographic locations, may assign different tasks and/or responsibilities to a particular organization-specific role, which may cause the particular organization-specific role to map to a different standardized role and/or a different title-class identifier based on the geographic location in which the particular organization-specific role is being performed.

It is to be understood that these configurations are provided by way of example. In practice, any combination of these configurations may be implemented and/or other configurations may be implemented that are not explicitly described herein. Furthermore, while setting a configuration of the data model is described as a pre-step to using the data model to generate scores, it is to be understood that in some implementations, processing needed to set the configuration may be performed as part of the data model's processing (e.g., as part of the processing performed in connection with reference number 150, as described below).

In this way, the role management platform is able to set the configuration of the data model based on the information included in the request.

As shown in FIG. 1E, and by reference number 150, the role management platform may use the data model to determine a set of scores that indicate likelihoods of the set of titles mapping to the set of title-class identifiers. For example, the role management platform may provide, as input data to the neural network, data that identifies the set of titles of the organization-specific roles, the set of vectors, data that identifies an industry in which the organization operates, location data that identifies a geographic location at which one or more organization-specific roles are performed, and/or the like. This may cause the neural network to analyze the input data to determine a set of scores that indicate likelihoods of the set of titles mapping to the set of title-class identifiers. Additional details regarding how the neural network processes input data may be found elsewhere herein (e.g., in FIG. 1C).

As shown by reference number 155, the role management platform may identify a subset of title-class identifiers, of the set of title-class identifiers, based on the set of scores. For example, the role management platform may, for each organization-specific role within the organization, have determined scores that indicate likelihoods of each organization-specific role mapping to a particular title-class identifier. In this case, the role management platform may identify a best-available score for each organization-specific role, which may be associated with a particular title-class identifier. As a specific example, if there are one thousand title-class identifiers, the role management platform may, for a title of an organization-specific role, determine a score for each title-class identifier, and may identify a particular title-class identifier that has a best-available score (e.g., a highest score, etc.).

As shown by reference number 160, the role management platform may obtain information relating to standardized roles using the subset of title-class identifiers that have been identified. For example, the role management platform may use the subset of title-class identifiers to search a data structure that associates the subset of title-class identifiers with the information relating to the standardized roles.

The information relating to the standardized roles may include information describing a set of tasks performed as part of the standardized roles, information describing a set of skills, knowledge, abilities, and/or work experience needed to effectively perform the standardized roles, information identifying relationships between standardized roles and particular tasks, payment information across one or more industries that identifies what organizations are usually paying individuals for performing for the standardized roles, contextual information relating to the set of tasks, and/or the like. The contextual information may indicate a distribution of time spent performing particular tasks of a standardized role. For example, the contextual information may indicate that individuals performing a particular standardized role often spent X amount of time working at a desktop computer, Y amount of time working with groups or teams, Z amount of time checking e-mails or taking telephone calls, and/or the like.

In this way, the role management platform is able to determine a set of scores and to use the set of scores to obtain information that may be used to improve one or more organization-specific roles within the organization, as described further herein.

As shown in FIG. 1F, and by reference number 165, the role management platform may generate a recommendation to modify or eliminate one or more tasks associated with one or more organization-specific roles. For example, the role management platform may generate a recommendation based on an analysis of information relating to a corresponding standardized role. The recommendation may include data that identifies one or more tasks or organization-specific roles that are to be modified or eliminated, data that identifies when to modify or to eliminate the one or more tasks or organization-specific roles, data that identifies how to modify or to eliminate the one or more tasks or organization-specific roles, and/or the like.

In some implementations, the role management platform may generate a recommendation to modify or eliminate a task of an organization-specific role based on an analysis of information relating to a corresponding standardized role. For example, the role management platform may analyze the information that relates to the corresponding standardized role (as defined elsewhere herein) and may identify a set of discrepancies between the standardized role and the organization-specific role. In this case, the role management platform might identify tasks performed as part of the organization-specific role that are not performed as part of the standardized role (or vice versa), might identify skills, knowledge, abilities, and/or work experience that were thought to be required for the organization-specific role but that were not required for the standardized role (or vice versa), might identify that the organization-specific role involves spending a disproportionate amount of time on a particular task relative to the standardized role (or vice versa), and/or the like. Furthermore, in some cases, the role management platform might determine that multiple organization-specific roles are described as a single standardized role. Additionally, the role management platform may analyze the set of discrepancies to generate a recommendation to modify or remove one or more tasks of the organization-specific role (e.g., such that the organization-specific role is standardized to become more similar to the standardized role, etc.).

As shown by reference number 170, the role management platform may provide mapping data and/or the recommendation to the client device. The mapping data may identify associations between the organization-specific roles within the organization and the standardized roles. In this case, the role management platform may provide the mapping data and/or the recommendation to the client device via an interface, such as an API associated with the application or a website used to create the request, and/or via a similar type of interface.

As shown by reference number 175, the client device may display the mapping data and/or the recommendation via the interface. This may allow a user associated with the organization to view the mapping data and/or the recommendation, and may allow the user to determine whether to implement the recommendation, whether to provide feedback information that indicates an accuracy of content included within the mapping data, whether to provide feedback information to modify the recommendation, and/or the like.

In some implementations, the client device may generate and provide the role management platform with feedback information that indicates an accuracy of the content included within the mapping data. For example, the client device may notice that certain mappings between organization-specific roles and standardized roles are not accurate. In this case, the client device may provide feedback information to the role management platform. This may allow the role management platform to retrain the data model. For example, the role management platform may update the set of weights that are used as part of the cost function, such that the data model may be able to accurately score subsequent mappings that are requested by the client device.

In some implementations, the client device may generate and provide the role management platform with feedback information that indicates to modify the recommendation. For example, a user may agree with a first part of the recommendation but disagree with a second part of the recommendation. In this case, the user may input feedback information that indicates to modify the second part of the recommendation and may provide the feedback information to the role management platform. This may allow the role management platform to analyze the feedback information in a manner that improves accuracy of subsequent recommendations.

In some implementations, the role management platform may perform one or more actions that cause the recommendation to be implemented. For example, the role management platform may, as described above, provide the recommendation to the client device, which may cause the client device to perform one or more actions that cause the recommendation to be implemented. Additionally, or alternatively, the role management platform may assist the organization in implementing the recommendation. For example, if a task is recommended to be modified or removed, the role management platform may generate an updated list of tasks for an organization-specific role, such that the list identifies and/or describes the task that has been modified (or that omits the task that has been removed). In this case, the role management platform may also provide a notification to devices associated with one or more employees that may be responsible for performing the modified tasks (or no longer performing the removed task). Additionally, or alternatively, and provided as another example, if a new task is recommended to be added to the organization-specific role, the role management platform may generate instructions on how to perform the new task, may notify devices of one or more employees that will be responsible for performing the new task, and/or the like.

By mapping the organization-specific roles to the standardized roles, the role management is able to perform actions that improve efficiencies within the organization. In this way, the role management platform provides for an efficient and effective utilization of resources of devices associated with the organization (e.g., processing resources, network resources, memory resources, and/or the like).

As indicated above, FIGS. 1A-1F are provided merely as one or more examples. Other examples may differ from what is described with regard to FIGS. 1A-1F. For example, there may be additional devices and/or networks, fewer devices and/or networks, different devices and/or networks, or differently arranged devices and/or networks than those shown in FIGS. 1A-1F. Furthermore, two or more devices shown in FIGS. 1A-1F may be implemented within a single device, or a single device shown in FIGS. 1A-1F may be implemented as multiple and/or distributed devices. Additionally, or alternatively, a set of devices (e.g., one or more devices) of example implementation 100 may perform one or more functions described as being performed by another set of devices of example implementation 100.

Figure 2:
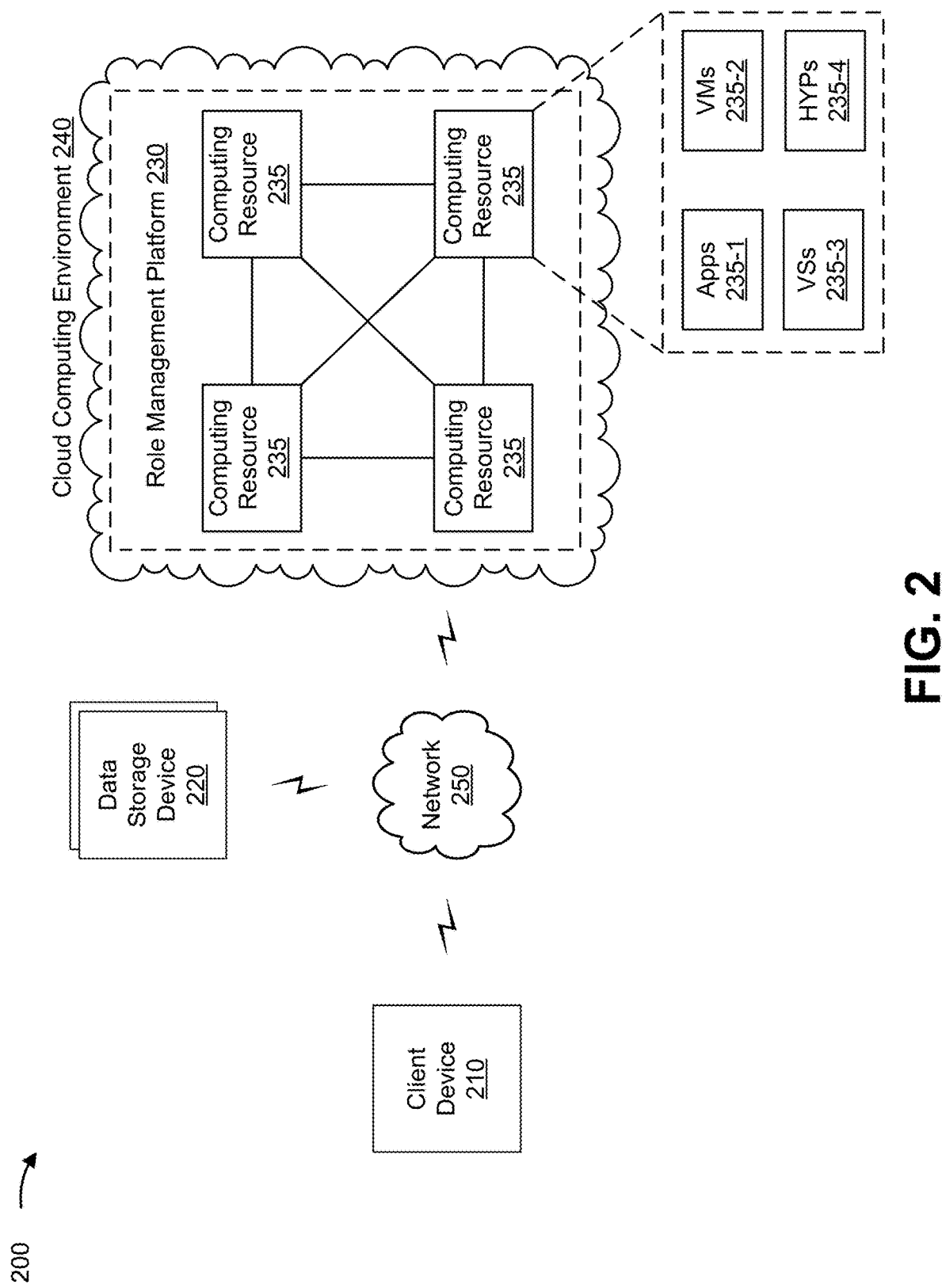
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a data storage device 220, a role management platform 230 hosted within a cloud computing environment 240, and/or a network 250. Devices of environment 200 may interconnect via wired connections, wireless connections, or a combination of wired and wireless connections.

Client device 210 includes one or more devices capable of receiving, generating, storing, processing, and/or providing information associated with roles within an organization. For example, client device 210 may include a communication and/or computing device, such as a mobile phone (e.g., a smart phone, a radiotelephone, etc.), a laptop computer, a tablet computer, a handheld computer, a server computer, a gaming device, a wearable communication device (e.g., a smart wristwatch, a pair of smart eyeglasses, etc.), or a similar type of device. In some implementations, client device 210 may provide, to role management platform 230, a request associated with standardizing a set of organization-specific roles within an organization. In some implementations, client device 210 may receive, from role management platform 230, information that may be used to satisfy the request. For example, client device 210 may receive data identifying title-class identifiers and/or a recommendation, as further described elsewhere herein.

Data storage device 220 includes one or more devices capable of receiving, storing, generating, determining, and/or providing information associated with organization-specific roles within an organization and/or standardized roles within an industry or taxonomy-defined domain. For example, data storage device 220 may include a server device or a group of server devices. In some implementations, data storage device 220 may use one or more data structures to store data, such as a database (e.g., a relational database), a linked-list, an array, a tree, a graph, a taxonomy, and/or a similar type of data structure. In some implementations, a first data storage device 220 may provide, to role management platform 230, data that identifies a set of titles for standardized roles (e.g., which may be standardized as part of a taxonomy) and data identifying a hierarchy of role classifications. Additionally, or alternatively, a second data storage device 220 may provide data that identifies a set of historical titles for organization-specific roles for a group of organizations to role management platform 230.

Role management platform 230 includes one or more devices capable of receiving, storing, generating, determining, and/or providing information associated with servicing requests provided by client device 210. For example, role management platform 230 may include a server device (e.g., a host server, a web server, an application server, etc.), a data center device, or a similar device. In some implementations, role management platform 230 may train a data model (e.g., a neural network, etc.) and/or may receive a trained data model. In this case, role management platform 230 may use the data model to process requests made by client device 210.

In some implementations, as shown, role management platform 230 may be hosted in cloud computing environment 240. Notably, while implementations described herein describe role management platform 230 as being hosted in cloud computing environment 240, in some implementations, role management platform 230 might not be cloud-based (i.e., may be implemented outside of a cloud computing environment) or may be partially cloud-based.

Cloud computing environment 240 includes an environment that hosts role management platform 230. Cloud computing environment 240 may provide computation, software, data access, storage, etc. services that do not require end-user knowledge of a physical location and configuration of system(s) and/or device(s) that hosts role management platform 230. As shown, cloud computing environment 240 may include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 may host role management platform 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 may include one or more software applications that may be provided to or accessed by client device 210 and/or data storage device 220. Application 235-1 may eliminate a need to install and execute the software applications on these devices. For example, application 235-1 may include software associated with role management platform 230 and/or any other software capable of being provided via cloud computing environment 240. In some implementations, one application 235-1 may send/receive information to/from one or more other applications 235-1, via virtual machine 235-2. In some implementations, application 235-1 may include one or more functions and/or features that allow client device 210 to generate requests, as further described elsewhere herein.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of another device (e.g., client device 210, data storage device 220, etc.), and may manage infrastructure of cloud computing environment 240, such as data management, synchronization, or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

Network 250 includes one or more wired and/or wireless networks. For example, network 250 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
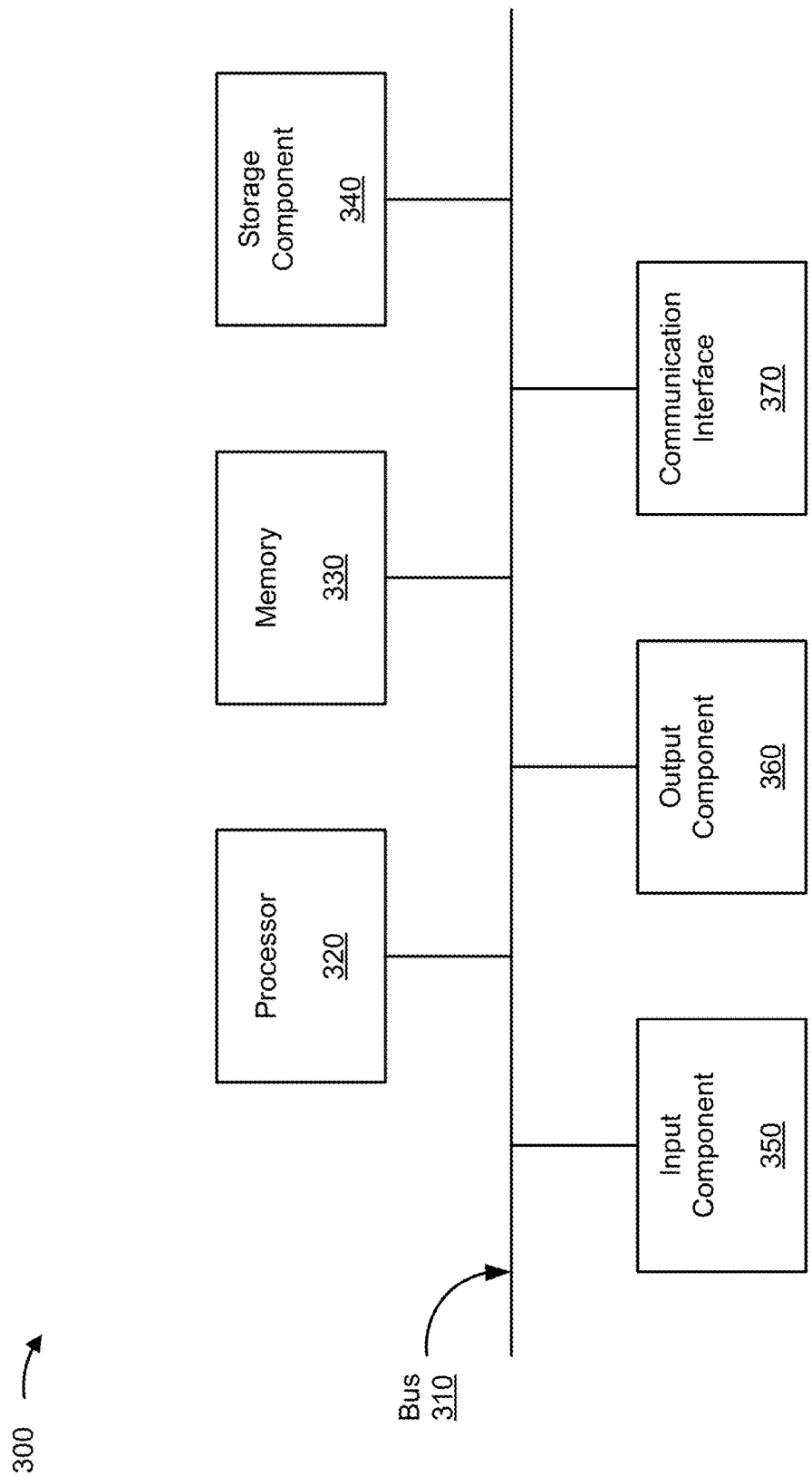
FIG. 3 is a diagram of example components of one or more devices of FIG. 2.

FIG. 3 is a diagram of example components of a device 300. Device 300 may correspond to client device 210, data storage device 220, and/or role management platform 230. In some implementations, client device 210, data storage device 220, and/or role management platform 230 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among multiple components of device 300. Processor 320 is implemented in hardware, firmware, and/or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
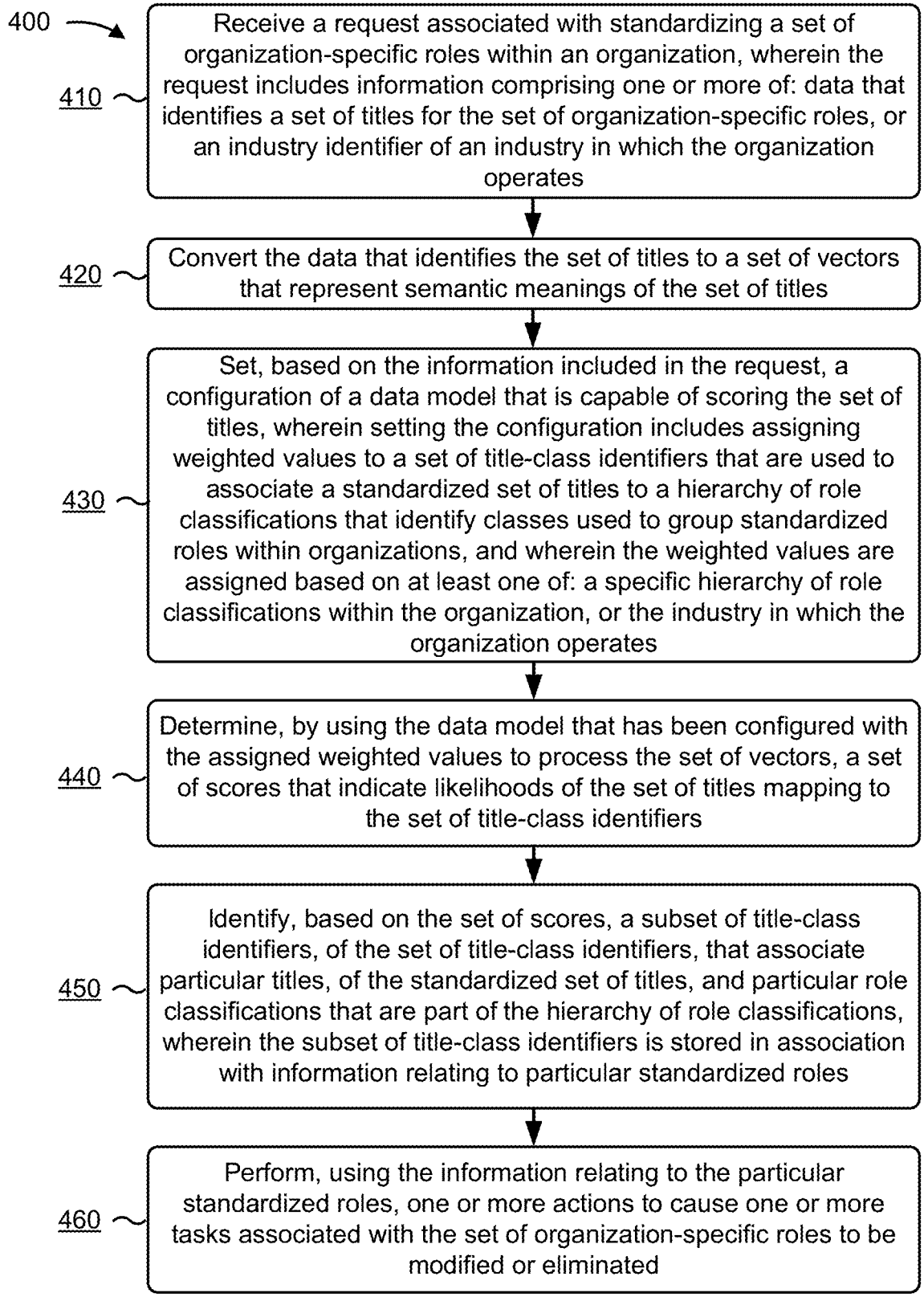
FIGS. 4-6 are flow charts of an example process for mapping a set of organization-specific roles within an organization to a set of standardized roles and causing one or more tasks associated with the set of organization-specific roles to be modified or eliminated by utilizing information made available from the mapping.

FIG. 4 is a flow chart of an example process 400 for mapping a set of organization-specific roles within an organization to a set of standardized roles and causing one or more tasks associated with the set of organization-specific roles to be modified or eliminated by utilizing information made available from the mapping. In some implementations, one or more process blocks of FIG. 4 may be performed by a role management platform (e.g., role management platform 230). In some implementations, one or more process blocks of FIG. 4 may be performed by another device or a group of devices separate from or including the role management platform, such as a client device (e.g., client device 210), a data storage device (e.g., data storage device 220), and/or the like.

As shown in FIG. 4, process 400 may include receiving a request associated with standardizing a set of organization-specific roles within an organization, wherein the request includes information comprising one or more of: data that identifies a set of titles for the set of organization-specific roles, or an industry identifier of an industry in which the organization operates (block 410). For example, the role management platform (e.g., using computing resource 235, processor 320, memory 330, storage component 340, input component 350, communication interface 370, and/or the like) may receive a request associated with standardizing a set of organization-specific roles within an organization, as described above. In some implementations, the request may include information comprising one or more of: data that identifies a set of titles for the set of organization-specific roles, or an industry identifier of an industry in which the organization operates.

As further shown in FIG. 4, process 400 may include converting the data that identifies the set of titles to a set of vectors that represent semantic meanings of the set of titles (block 420). For example, the role management platform (e.g., using computing resource 235, processor 320, memory 330, storage component 340, and/or the like) may convert the data that identifies the set of titles to a set of vectors that represent semantic meanings of the set of titles, as described above.

As further shown in FIG. 4, process 400 may include setting, based on the information included in the request, a configuration of a data model that is capable of scoring the set of titles, wherein setting the configuration includes assigning weighted values to a set of title-class identifiers that are used to associate a standardized set of titles to a hierarchy of role classifications that identify classes used to group standardized roles within organizations, and wherein the weighted values are assigned based on at least one of: a specific hierarchy of role classifications within the organization, or the industry in which the organization operates (block 430). For example, the role management platform (e.g., using computing resource 235, processor 320, memory 330, storage component 340, and/or the like) may set, based on the information included in the request, a configuration of a data model that is capable of scoring the set of titles, as described above. In some implementations, setting the configuration may include assigning weighted values to a set of title-class identifiers that are used to associate a standardized set of titles to a hierarchy of role classifications that identify classes used to group standardized roles within organizations. In some implementations, the weighted values may be assigned based on at least one of: a specific hierarchy of role classifications within the organization, or the industry in which the organization operates.

As further shown in FIG. 4, process 400 may include determining, by using the data model that has been configured with the assigned weighted values to process the set of vectors, a set of scores that indicate likelihoods of the set of titles mapping to the set of title-class identifiers (block 440). For example, the role management platform (e.g., using computing resource 235, processor 320, memory 330, storage component 340, and/or the like) may determine, by using the data model that has been configured with the assigned weighted values to process the set of vectors, a set of scores that indicate likelihoods of the set of titles mapping to the set of title-class identifiers, as described above.

As further shown in FIG. 4, process 400 may include identifying, based on the set of scores, a subset of title-class identifiers, of the set of title-class identifiers, that associate particular titles, of the standardized set of titles, and particular role classifications that are part of the hierarchy of role classifications, wherein the subset of title-class identifiers is stored in association with information relating to particular standardized roles (block 450). For example, the role management platform (e.g., using computing resource 235, processor 320, memory 330, storage component 340, and/or the like) may identify, based on the set of scores, a subset of title-class identifiers, of the set of title-class identifiers, that associate particular titles, of the standardized set of titles, and particular role classifications that are part of the hierarchy of role classifications, as described above. In some implementations, the subset of title-class identifiers may be stored in association with information relating to particular standardized roles.

As further shown in FIG. 4, process 400 may include performing, using the relating to the particular standardized roles, one or more actions to cause one or more tasks associated with the set of organization-specific roles to be modified or eliminated (block 460). For example, the role management platform (e.g., using computing resource 235, processor 320, memory 330, storage component 340, input component 350, output component 360, communication interface 370, and/or the like) may perform, using the information relating to the particular standardized roles, one or more actions to cause one or more tasks associated with the set of organization-specific roles to be modified or eliminated, as described above.

Process 400 may include additional implementations, such as any single implementation or any combination of implementations described below and/or in connection with one or more other processes described elsewhere herein.

In some implementations, the first weighted value and the one or more additional weighted values may be stored in a vector format. For example, the first weighted value and the one or more additional weighted values may be stored in a vector array or matrix. This format allows different classes or hierarchical levels of roles to be considered in the analysis performed by the data model, as described elsewhere herein. In some implementations, when setting the configuration of the data model, the role management platform may assign a first weighted value to a title portion of a title-class identifier based on whether a title, of the set of titles, maps to a particular title, of the standardized set of titles, and may assign one or more additional weighted values to one or more classification portions of the title-class identifier based on whether the title maps to one or more role classifications of the hierarchy of role classifications.

In some implementations, the one or more additional weighted values may be greater than the first weighted value, and the one or more additional weighted values may be assigned based on the hierarchy of role classifications. In some implementations, the data model may include a neural network.

In some implementations, the role management platform may receive, before receiving the request, data that identifies a first standardized set of titles and a first hierarchy of role classifications. In some implementations, the role management platform may receive data that identifies a first set of historical titles associated with a group of organizations. In some implementations, the role management platform may generate data that identifies a second standardized set of titles by using a system of adversarial neural networks to process the data that identifies the first standardized set of titles and the first hierarchy of role classifications. In some implementations, the role management platform may generate data that identifies a second set of historical titles by using the system of adversarial neural networks to process the data that identifies the first set of historical titles. In some implementations, the role management platform may generate data that identifies particular title-class identifiers by using the system of adversarial neural networks to process the data that identifies the second standardized set of titles and the data that identifies the second set of historical titles. The particular title-class identifiers may be included in the set of title-class identifiers.

In some implementations, the role management platform, when performing the one or more actions, may generate a recommendation to modify or eliminate a task of an organization-specific role based on an analysis of particular information that describes a corresponding standardized role of the particular standardized roles. Additionally, the role management platform may provide the recommendation to a user device to cause the user device to perform particular actions to implement the recommendation.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
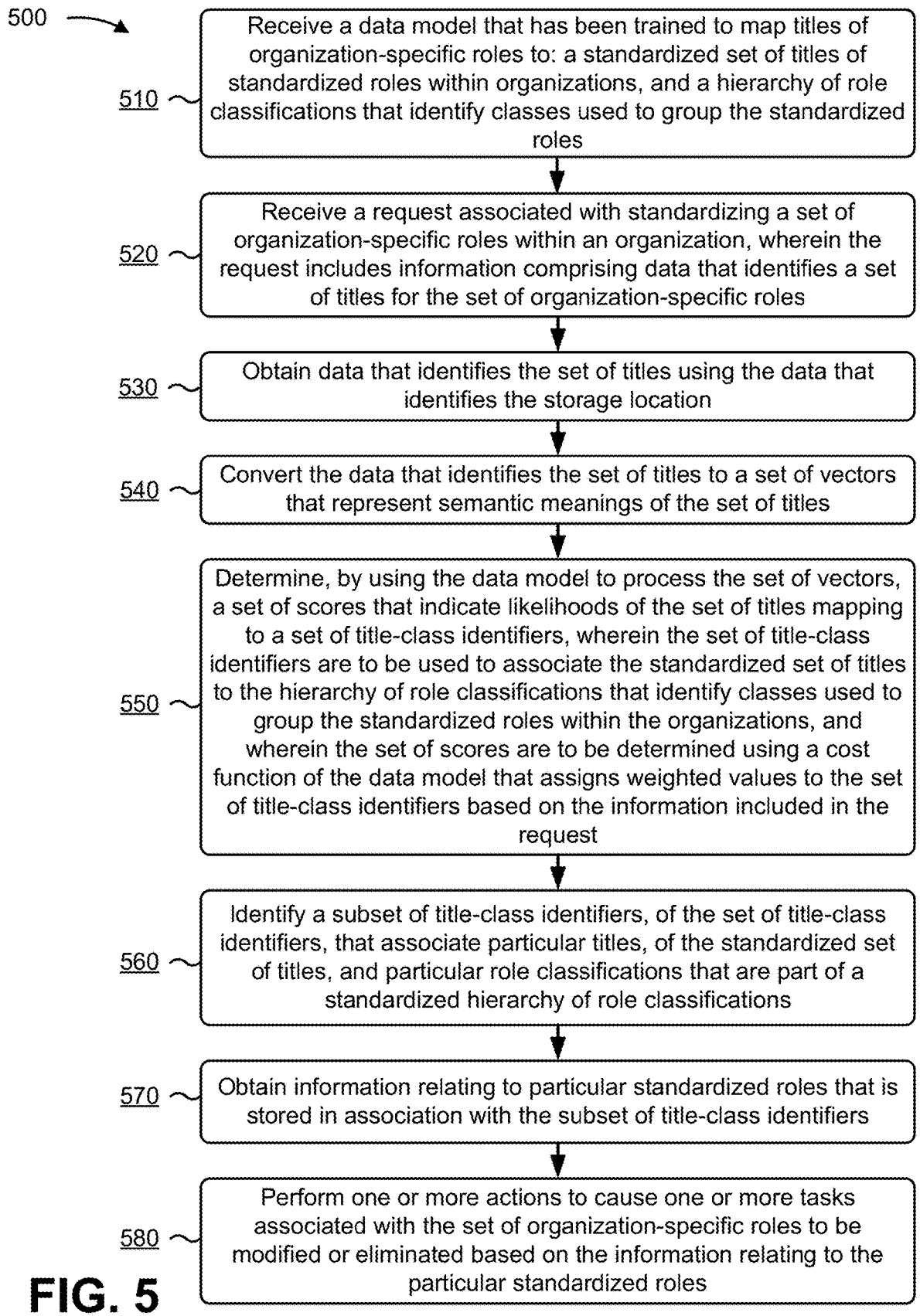

FIG. 5 is a flow chart of an example process 500 for mapping a set of organization-specific roles within an organization to a set of standardized roles and causing one or more tasks associated with the set of organization-specific roles to be modified or eliminated by utilizing information made available from the mapping. In some implementations, one or more process blocks of FIG. 5 may be performed by a role management platform (e.g., role management platform 230). In some implementations, one or more process blocks of FIG. 5 may be performed by another device or a group of devices separate from or including the role management platform, such as a client device (e.g., client device 210), a data storage device (e.g., data storage device 220), and/or the like.

As shown in FIG. 5, process 500 may include receiving a data model that has been trained to map titles for organization-specific roles to: a standardized set of titles for organization-specific roles within organizations, and a hierarchy of role classifications that identify classes used to group the standardized roles (block 510). For example, the role management platform (e.g., using computing resource 235, processor 320, memory 330, storage component 340, input component 350, communication interface 370, and/or the like) may receive a data model that has been trained to map titles to a standardized set of titles for organization-specific roles within organizations, and to a hierarchy of role classifications that identify classes used to group the standardized roles, as described above.

As further shown in FIG. 5, process 500 may include receiving a request associated with standardizing a set of organization-specific roles within an organization, wherein the request includes information comprising data that identifies a set of titles for the set of organization-specific roles (block 520). For example, the role management platform (e.g., using computing resource 235, processor 320, memory 330, storage component 340, input component 350, communication interface 370, and/or the like) may receive a request associated with standardizing a set of organization-specific roles within an organization, as described above. In some implementations, the request may include information comprising data that identifies a set of titles for the set of organization-specific roles.

As further shown in FIG. 5, process 500 may include obtaining data that identifies the set of titles using the data that identifies the storage location (block 530). For example, the role management platform (e.g., using computing resource 235, processor 320, memory 330, storage component 340, and/or the like) may obtain data that identifies the set of titles using the data that identifies the storage location, as described above.

As further shown in FIG. 5, process 500 may include converting the data that identifies the set of titles to a set of vectors that represent semantic meanings of the set of titles (block 540). For example, the role management platform (e.g., using computing resource 235, processor 320, memory 330, storage component 340, and/or the like) may convert the data that identifies the set of titles to a set of vectors that represent semantic meanings of the set of titles, as described above.

As further shown in FIG. 5, process 500 may include determining, by using the data model to process the set of vectors, a set of scores that indicate likelihoods of the set of titles mapping to a set of title-class identifiers, wherein the set of title-class identifiers are to be used to associate the standardized set of titles to the hierarchy of role classifications that identify classes used to group the standardized roles within the organizations, and wherein the set of scores are to be determined using a cost function of the data model that assigns weighted values to the set of title-class identifiers based on the information included in the request (block 550). For example, the role management platform (e.g., using computing resource 235, processor 320, memory 330, storage component 340, and/or the like) may determine, by using the data model to process the set of vectors, a set of scores that indicate likelihoods of the set of titles mapping to a set of title-class identifiers, as described above. In some implementations, the set of title-class identifiers may be used to associate the standardized set of titles to the hierarchy of role classifications that identify classes used to group the standardized roles within the organizations. In some implementations, the set of scores may be determined using a cost function of the data model that assigns weighted values to the set of title-class identifiers based on the information included in the request.

As further shown in FIG. 5, process 500 may include identifying, based on the set of scores, a subset of title-class identifiers, of the set of title-class identifiers, that associate particular titles, of the standardized set of titles, and particular role classifications that are part of a standardized hierarchy of role classifications (block 560). For example, the role management platform (e.g., using computing resource 235, processor 320, memory 330, storage component 340, and/or the like) may identify, based on the set of scores, a subset of title-class identifiers, of the set of title-class identifiers, that associate particular titles, of the standardized set of titles, and particular role classifications that are part of a standardized hierarchy of role classifications, as described above.

As further shown in FIG. 5, process 500 may include obtaining information relating to particular standardized roles that is stored in association with the subset of title-class identifiers (block 570). For example, the role management platform (e.g., using computing resource 235, processor 320, memory 330, storage component 340, output component 360, communication interface 370, and/or the like) may obtain information relating to particular standardized roles that is stored in association with the subset of title-class identifiers, as described above.

As further shown in FIG. 5, process 500 may include performing one or more actions to cause one or more tasks associated with the set of organization-specific roles to be modified or eliminated based on the information relating to the particular standardized roles (block 580). For example, the role management platform (e.g., using computing resource 235, processor 320, memory 330, storage component 340, output component 360, communication interface 370, and/or the like) may perform one or more actions to cause one or more tasks associated with the set of organization-specific roles to be modified or eliminated based on the information relating to the particular standardized roles, as described above.

Process 500 may include additional implementations, such as any single implementation or any combination of implementations described below and/or in connection with one or more other processes described elsewhere herein.

In some implementations, the request may include an industry identifier of an industry in which the organization operates, and the role management platform may set a configuration of the data model based on the information included in the request, where setting the configuration includes assigning the weighted values to the set of title-class identifiers based on the industry in which the organization operates. In some implementations, the role management platform receive, from a user device, feedback information indicating whether the set of organization-specific roles map to the set of title-class identifiers. In some implementations, the one or more additional weighted values may be greater than the first weighted value, and the one or more additional weighted values may be assigned based on the hierarchy of role classifications.

In some implementations, the data model may be a neural network, and the role management platform may provide the set of vectors as input to the neural network to cause the neural network to output the set of scores. The cost function may assign each title-class identifier, of the set of title-class identifiers: a first weighted value to a title portion of a title-class identifier based on whether a title, of the set of titles, maps to a title of the standardized set of titles, and one or more additional weighted values to one or more classification portions of the title-class identifier based on whether the title maps to one or more role classifications of the hierarchy of role classifications.

In some implementations, when converting the data that identifies the set of titles, the role management platform may convert the data that identifies the set of titles to the set of vectors using a neural network.

In some implementations, when performing the one or more actions, the role management platform may generate a recommendation to modify or eliminate a task of an organization-specific role based on an analysis of particular information relating to a corresponding title of the particular titles. The recommendation may include data that identifies the task or the organization-specific role that is to be modified or eliminated, data that identifies when to modify or eliminate the task or the organization-specific role, data that identifies how to modify or eliminate the task or the organization-specific role, and/or the like. Additionally, the role management platform may provide the recommendation to a user device to permit the user device to display the recommendation via an interface.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
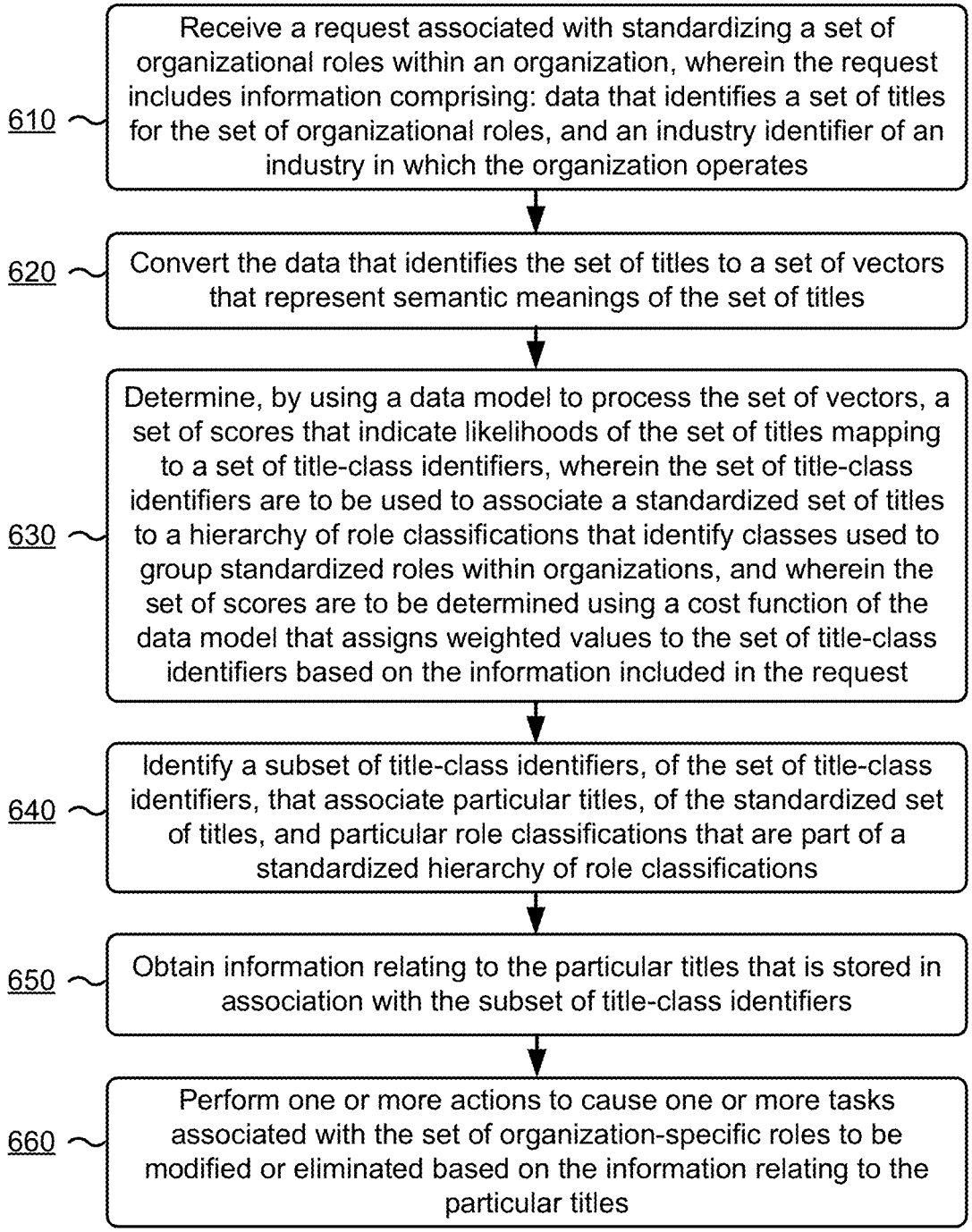

FIG. 6 is a flow chart of an example process 600 for mapping a set of organization-specific roles within an organization to a set of standardized roles and causing one or more tasks associated with the set of organization-specific roles to be modified or eliminated by utilizing information made available from the mapping. In some implementations, one or more process blocks of FIG. 6 may be performed by a role management platform (e.g., role management platform 230). In some implementations, one or more process blocks of FIG. 6 may be performed by another device or a group of devices separate from or including the role management platform, such as a client device (e.g., client device 210), a data storage device (e.g., data storage device 220), and/or the like.

As shown in FIG. 6, process 600 may include receiving a request associated with standardizing a set of organization-specific roles within an organization, wherein the request includes information comprising: data that identifies a set of titles for the set of organization-specific roles, and an industry identifier of an industry in which the organization operates (block 610). For example, the role management platform (e.g., using computing resource 235, processor 320, memory 330, storage component 340, input component 350, communication interface 370, and/or the like) may receive a request associated with standardizing a set of organization-specific roles within an organization, as described above. In some implementations, the request may include information comprising: data that identifies a set of titles for the set of organization-specific roles, and an industry identifier of an industry in which the organization operates.

As further shown in FIG. 6, process 600 may include converting the data that identifies the set of titles to a set of vectors that represent semantic meanings of the set of titles (block 620). For example, the role management platform (e.g., using computing resource 235, processor 320, memory 330, storage component 340, and/or the like) may convert the data that identifies the set of titles to a set of vectors that represent semantic meanings of the set of titles, as described above.

As further shown in FIG. 6, process 600 may include determining, by using a data model to process the set of vectors, a set of scores that indicate likelihoods of the set of titles mapping to a set of title-class identifiers, wherein the set of title-class identifiers are to be used to associate a standardized set of titles to a hierarchy of role classifications that identify classes used to group standardized roles within organizations, and wherein the set of scores are to be determined using a cost function of the data model that assigns weighted values to the set of title-class identifiers based on the information included in the request (block 630). For example, the role management platform (e.g., using computing resource 235, processor 320, memory 330, storage component 340, and/or the like) may determine, by using a data model to process the set of vectors, a set of scores that indicate likelihoods of the set of titles mapping to a set of title-class identifiers, as described above. In some implementations, the set of title-class identifiers may be used to associate a standardized set of titles to a hierarchy of role classifications that identify classes used to group standardized roles within organizations, and the set of scores may be determined using a cost function of the data model that assigns weighted values to the set of title-class identifiers based on the information included in the request.

As further shown in FIG. 6, process 600 may include identifying, based on the set of scores, a subset of title-class identifiers, of the set of title-class identifiers, that associate particular titles, of the standardized set of titles, and particular role classifications that are part of a standardized hierarchy of role classifications (block 640). For example, the role management platform (e.g., using computing resource 235, processor 320, memory 330, storage component 340, and/or the like) may identify, based on the set of scores, a subset of title-class identifiers, of the set of title-class identifiers, that associate particular titles, of the standardized set of titles, and particular role classifications that are part of a standardized hierarchy of role classifications, as described above.

As further shown in FIG. 6, process 600 may include obtaining information relating to particular standardized roles that is stored in association with the subset of title-class identifiers (block 650). For example, the role management platform (e.g., using computing resource 235, processor 320, memory 330, storage component 340, input component 350, communication interface 370, and/or the like) may obtain information relating to particular standardized roles that is stored in association with the subset of title-class identifiers, as described above.

As further shown in FIG. 6, process 600 may include performing one or more actions to cause one or more tasks associated with the set of organization-specific roles to be modified or eliminated based on the particular relating to the particular standardized roles (block 660). For example, the role management platform (e.g., using computing resource 235, processor 320, memory 330, storage component 340, output component 350, communication interface 370, and/or the like) may perform one or more actions to cause one or more tasks associated with the set of organization-specific roles to be modified or eliminated based on the particular relating to the particular standardized roles, as described above.

Process 600 may include additional implementations, such as any single implementation or any combination of implementations described below and/or in connection with one or more other processes described elsewhere herein.

In some implementations, the role management platform may set, after receiving the request, a configuration of the data model that is set based on the information included in the request. In some implementations, when setting the configuration of the data model, the role management platform may assign a first weighted value to a title portion of a title-class identifier based on whether a title, of the set of titles, maps to a title of the particular titles included in the standardized set of titles. Additionally, the role management platform may assign a second weighted value to a first classification portion of the title-class identifier based on whether the title maps to a first role classification of the hierarchy of role classifications, and may assign one or more additional weighted values to one or more other classification portions of the title-class identifier based on whether the title maps to one or more other role classifications of the hierarchy of role classifications. In some implementations, the one or more additional weighted values may be greater than the first weighted value, and the one or more additional weighted values may be assigned based on the hierarchy of role classifications.

In some implementations, the role management platform may convert the data that identifies the set of titles to the set of vectors using a neural network.

In some implementations, the role management platform may, before receiving the request, receive data that identifies a first standardized set of titles and a first hierarchy of role classifications. In some implementations, the role management platform may receive data that identifies a first set of historical titles associated with a group of organizations. In some implementations, the role management platform may generate data that identifies a second standardized set of titles by using a system of adversarial neural networks to process the data that identifies the first standardized set of titles and the first hierarchy of role classifications. In some implementations, the role management platform may generate data that identifies a second set of historical titles by using the system of adversarial neural networks to process the data that identifies the first set of historical titles. In some implementations, the role management platform may generate data that identifies particular title-class identifiers by using the system of adversarial neural networks to process the data that identifies the second standardized set of titles and the data that identifies the second set of historical titles. The particular title-class identifiers may be included in the set of title-class identifiers.

In some implementations, when performing the one or more actions, the role management platform may generate a recommendation to modify or eliminate a task of an organization-specific role based on an analysis of particular information that describes a corresponding standardized role of the particular standardized roles. Additionally, the role management platform may determine that the recommendation satisfies a threshold confidence level. Additionally, the role management platform may determine that the recommendation satisfies a threshold confidence level.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, data that identifies a first standardized set of titles and a first hierarchy of role classifications;
   receiving, by the device, data that identifies a first set of historical titles associated with a group of organizations;
   generating, by the device, data that identifies a second standardized set of titles by using a system of adversarial neural networks to process the data that identifies the first standardized set of titles and the first hierarchy of role classifications;
   generating, by the device, data that identifies a second set of historical titles by using the system of adversarial neural networks to process the data that identifies the first set of historical titles;
   generating, by the device, data that identifies particular title-class identifiers by using the system of adversarial neural networks to process the data that identifies the second standardized set of titles and the data that identifies the second set of historical titles;
   receiving, by the device, a request associated with standardizing a set of organization-specific roles within an organization of the group of organizations,
      wherein the request includes information comprising one or more of:
         data that identifies a set of titles for the set of organization-specific roles, or
         an industry identifier for an industry in which the organization operates;
   converting, by the device, the data that identifies the set of titles to a set of vectors that represent semantic meanings of the set of titles;
   setting, by the device and based on the information included in the request, a configuration of a data model that is capable of scoring the set of titles,
      wherein setting the configuration includes assigning weighted values to a set of title-class identifiers, including the particular title-class identifiers, that are used, by a set of adversarial neural networks, including the system of adversarial neural networks, of the data model, to associate a standardized set of titles to a hierarchy of role classifications that identify classes used to group standardized roles within organizations, and
      wherein the weighted values are assigned based on at least one of:
         a specific hierarchy of role classifications within the organization, or
         the industry in which the organization operates, and
      wherein the set of adversarial neural networks is trained based on historical titles associated with the set of title-class identifiers;
   determining, by the device and by using the data model that has been configured with the weighted values to process the set of vectors, a set of scores that indicate likelihoods of the set of titles mapping to the set of title-class identifiers;

identifying, by the device and based on the set of scores, a subset of title-class identifiers, of the set of title-class identifiers, that associate particular titles, of the standardized set of titles, and particular role classifications that are part of the hierarchy of role classifications, wherein the subset of title-class identifiers is stored in association with information relating to particular standardized roles;

providing, by the device and via an application programming interface, the information relating to the particular standardized roles to a client device by generating a recommendation to modify or eliminate one or more tasks associated with the set of organization-specific roles; and performing, by the device and by using the information relating to the particular standardized roles, one or more actions to cause one or more tasks associated with the set of organization-specific roles to be modified or eliminated.

2. The method of claim 1, wherein setting the configuration of the data model comprises:

assigning a first weighted value to a title portion of a title-class identifier based on whether a title, of the set of titles, maps to a particular title, of the standardized set of titles, and assigning one or more additional weighted values to one or more classification portions of the title-class identifier based on whether the title maps to one or more role classifications of the hierarchy of role classifications.

3. The method of claim 2, wherein the first weighted value and the one or more additional weighted values are stored in a vector format.

4. The method of claim 2, wherein the one or more additional weighted values are greater than the first weighted value; and wherein the one or more additional weighted values are assigned based on the hierarchy of role classifications.

5. The method of claim 1, wherein the data model comprises a neural network.

6. The method of claim 1, wherein performing the one or more actions comprises:

generating another recommendation to modify or eliminate a task of an organization-specific role based on an analysis of particular information that describes a corresponding standardized role of the particular standardized roles; and providing the other recommendation to a user device to cause the user device to perform particular actions to implement the other recommendation.

7. A device, comprising:

one or more memories; and one or more processors, operatively coupled to the one or more memories, to:

receive data that identifies a first standardized set of titles and a first hierarchy of role classifications;

receive data that identifies a first set of historical titles associated with a group of organizations;

generate data that identifies a second standardized set of titles by using a system of adversarial neural networks to process the data that identifies the first standardized set of titles and the first hierarchy of role classifications;

generate data that identifies a second set of historical titles by using the system of adversarial neural networks to process the data that identifies the first set of historical titles;

generate data that identifies particular title-class identifiers by using the system of adversarial neural networks to process the data that identifies the second standardized set of titles and the data that identifies the second set of historical titles;

receive a data model that includes a set of generative adversarial networks, including the system of adversarial neural networks, that have been trained to map titles to:

a standardized set of titles for standardized roles within organizations that are identified, by the set of generative adversarial networks, based on historical titles associated with the organizations, and a hierarchy of role classifications that identify classes used to group the standardized roles;

receive a request associated with standardizing a set of organization-specific roles within an organization of the group of organizations, wherein the request includes information comprising data that identifies a storage location for a set of titles for the set of organization-specific roles;

obtain data that identifies the set of titles using the data that identifies the storage location;

convert the data that identifies the set of titles to a set of vectors that represent semantic meanings of the set of titles;

determine, by using the data model to process the set of vectors, a set of scores that indicate likelihoods of the set of titles mapping to a set of title-class identifiers, including the particular title-class identifiers, associated with the historical titles, wherein the set of title-class identifiers are to be used to associate the standardized set of titles to the hierarchy of role classifications that identify types of the standardized roles within the organizations, and wherein the set of scores are to be determined using a cost function of the data model that assigns weighted values to the set of title-class identifiers based on the information included in the request;

identify, based on the set of scores, a subset of title-class identifiers, of the set of title-class identifiers, that associate particular titles, of the standardized set of titles, and particular role classifications that are part of a standardized hierarchy of role classifications;

obtain information relating to particular standardized roles that is stored in association with the subset of title-class identifiers;

provide the information relating to the particular standardized roles to a client device by generating a recommendation to modify or eliminate one or more tasks associated with the set of organization-specific roles; and perform one or more actions to cause one or more tasks associated with the set of organization-specific roles to be modified or eliminated based on the information relating to the particular standardized roles.

8. The device of claim 7, wherein the request includes an industry identifier of an industry in which the organization operates; and wherein the one or more processors are further to:

set a configuration of the data model based on the information included in the request, wherein setting the configuration includes assigning the weighted values to the set of title-class identifiers based on the industry in which the organization operates.

9. The device of claim 7, wherein the one or more processors are further to:
set, after receiving the request, a configuration of the data model that is set based on the information included in the request,
wherein the one or more processors, when setting the configuration of the data model, are to:
assign a first weighted value to a title portion of a title-class identifier based on whether a title, of the set of titles, maps to a standardized title of the set of standardized titles, and
assign one or more additional weighted values to one or more classification portions of the title-class identifier based on whether the title maps to one or more job classifications of the hierarchy of job classifications.

10. The device of claim 9, wherein the one or more additional weighted values are greater than the first weighted value, and wherein the one or more additional weighted values are assigned based on the hierarchy of role classifications.

11. The device of claim 7, wherein the data model is a neural network; and
wherein the one or more processors, when determining the set of scores, are to:
provide the set of vectors as input to the neural network to cause the neural network to output the set of scores,
wherein the cost function assigns each title-class identifier, of the set of title-class identifiers:
a first weighted value to a title portion of a title-class identifier based on whether a title, of the set of titles, maps to a title of the standardized set of titles, and
one or more additional weighted values to one or more classification portions of the title-class identifier based on whether the title maps to one or more role classifications of the hierarchy of role classifications.

12. The device of claim 7, wherein the one or more processors are further to:
receive, from a user device, feedback information indicating whether the set of organization-specific roles map to the set of title-class identifiers; and
update the weighted values that are assigned to the set of title-class identifiers based on the feedback information.

13. The device of claim 7, wherein the one or more processors, when performing the one or more actions, are to:
generate another recommendation to modify or eliminate a task of an organization-specific role based on an analysis of particular information that describes a corresponding standardized role of the particular standardized roles,
wherein the other recommendation includes at least one of:
data that identifies the task or the organization-specific role that is to be modified or eliminated,
data that identifies when to modify or eliminate the task or the organization-specific role, or
data that identifies how to modify or to eliminate the task or the organization-specific role; and
provide the other recommendation to a user device to permit the user device to display the other recommendation via an interface.

14. A non-transitory computer-readable medium storing instructions, the instructions comprising:
one or more instructions that, when executed by one or more processors of a device, cause the one or more processors to:
receive data that identifies a first standardized set of titles and a first hierarchy of role classifications;
receive data that identifies a first set of historical titles associated with a group of organizations;
generate data that identifies a second standardized set of titles by using a system of adversarial neural networks to process the data that identifies the first standardized set of titles and the first hierarchy of role classifications;
generate data that identifies a second set of historical titles by using the system of adversarial neural networks to process the data that identifies the first set of historical titles;
generate data that identifies particular title-class identifiers by using the system of adversarial neural networks to process the data that identifies the second standardized set of titles and the data that identifies the second set of historical titles;
receive a request associated with standardizing a set of organization-specific roles within an organization of the group of organizations,
wherein the request includes information comprising:
data that identifies a set of titles for the set of organization-specific roles, and
an industry identifier of an industry in which the organization operates;
convert the data that identifies the set of titles to a set of vectors that represent semantic meanings of the set of titles;
determine, by using a data model to process the set of vectors, a set of scores that indicate likelihoods of the set of titles mapping to a set of title-class identifiers including the particular title-class identifiers,
wherein the set of title-class identifiers are to be used to associate a standardized set of titles to a hierarchy of role classifications that identify classes used to group standardized roles within organizations, and
wherein the set of scores are to be determined using a cost function of the data model that assigns weighted values to the set of title-class identifiers based on the information included in the request;
identify, based on the set of scores, a subset of title-class identifiers, of the set of title-class identifiers, that associate particular titles, of the standardized set of titles, and particular role classifications that are part of a standardized hierarchy of role classifications;
obtain information relating to particular standardized roles that is stored in association with the subset of title-class identifiers;
provide the information relating to the particular standardized roles to a client device by generating a recommendation to modify or eliminate one or more tasks associated with the set of organization-specific roles; and
perform one or more actions to cause one or more tasks associated with the set of organization-specific roles to be modified or eliminated based on the information relating to the particular standardized roles.

15. The non-transitory computer-readable medium of claim 14, wherein the one or more instructions, when executed by the one or more processors, further cause the one or more processors to:
set, after receiving the request, a configuration of the data model that is set based on the information included in the request,
wherein the one or more instructions, that cause the one or more processors to set the configuration of the data model, cause the one or more processors to:
assign a first weighted value to a title portion of a title-class identifier based on whether a title, of the set of titles, maps to a title of the particular titles included in the standardized set of titles,
assign a second weighted value to a first classification portion of the title-class identifier based on whether the title maps to a first role classification of the hierarchy of role classifications, and
assign one or more additional weighted values to one or more other classification portions of the title-class identifier based on whether the title maps to one or more other role classifications of the hierarchy of role classifications.

16. The non-transitory computer-readable medium of claim 15, wherein the one or more additional weighted values are greater than the first weighted value, and wherein the one or more additional weighted values are assigned based on the hierarchy of role classifications.

17. The non-transitory computer-readable medium of claim 14, wherein the one or more instructions, that cause the one or more processors to convert the data that identifies the set of data, cause the one or more processors to:
convert the data that identifies the set of titles to the set of vectors using a neural network.

18. The non-transitory computer-readable medium of claim 14, wherein the one or more instructions, that cause the one or more processors to perform the one or more actions, cause the one or more processors to:
generate another recommendation to modify or eliminate a task of an organization-specific role based on an analysis of particular information that describes a corresponding standardized role of the particular standardized roles;
determine that the other recommendation satisfies a threshold confidence level; and
automatically implement the other recommendation based on the other recommendation satisfying the threshold confidence level.

19. The method of claim 1, wherein the system of adversarial neural networks includes one or more generator networks.

20. The non-transitory computer-readable medium of claim 14, wherein the system of adversarial neural networks includes one or more discriminator networks.

* * * * *